United States Patent [19]
Morton et al.

[11] Patent Number: 6,014,557
[45] Date of Patent: Jan. 11, 2000

[54] APPARATUS AND METHODS FOR PROVIDING WIRELESS SYSTEM FRAUD AND VISIBILITY DATA

[75] Inventors: John W. Morton, Atlanta; Thomas C. Smith, Roswell, both of Ga.

[73] Assignee: BellSouth Intellectual Property Corporation, Wilmington, Del.

[21] Appl. No.: 08/615,962

[22] Filed: Mar. 14, 1996

[51] Int. Cl.[7] .............................. H04Q 7/24; H04Q 7/34
[52] U.S. Cl. .................... 455/410; 455/461; 455/411; 455/67.1; 455/432; 455/434; 455/412; 455/552
[58] Field of Search .................... 455/410, 461, 455/411, 67.1, 405, 435, 423, 406, 408, 404, 412, 432, 436, 438, 440, 560, 422, 439; 379/34, 207, 112, 111; 370/250

[56] References Cited

U.S. PATENT DOCUMENTS

| | | | |
|---|---|---|---|
| 5,148,472 | 9/1992 | Freese et al. | 455/408 |
| 5,237,612 | 8/1993 | Raith | 380/23 |
| 5,335,265 | 8/1994 | Cooper et al. | 455/410 |
| 5,335,278 | 8/1994 | Matchett et al. | 455/410 |
| 5,420,910 | 5/1995 | Rudokas et al. | 455/410 |
| 5,448,632 | 9/1995 | Iyob et al. | 379/112 |
| 5,448,760 | 9/1995 | Frederick | 455/410 |
| 5,467,382 | 11/1995 | Schorman | 455/410 |
| 5,546,444 | 8/1996 | Roach, Jr. et al. | 379/59 |
| 5,555,551 | 9/1996 | Rudokas et al. | 455/410 |
| 5,592,530 | 1/1997 | Brockman et al. | 379/34 |
| 5,592,553 | 1/1997 | McHenry et al. | 455/435 |
| 5,608,781 | 3/1997 | Seiderman | 455/410 |
| 5,655,004 | 8/1997 | Holbrook | 455/411 |
| 5,873,043 | 2/1999 | Comer | 455/434 |

OTHER PUBLICATIONS

Espinosa, Rolando, "Cellular Signaling Network Management: The Industry's Most Important Challenge," *Telephony*, 227:27–30 (Aug. 22, 1994).

*Primary Examiner*—Wellington Chin
*Assistant Examiner*—Keith Ferguson
*Attorney, Agent, or Firm*—Mitchell G. Stockwell, Esq.; James L. Ewing, IV, Esq.; Kilpatrick Stockton LLP

[57] ABSTRACT

Apparatus and methods are disclosed for providing wireless telecommunications service providers roamer visibility for on-line customer support and a fraud data feed for reducing losses due to fraud, obviating the need for each provider to purchase data from a central clearinghouse. Monitoring devices are coupled to existing network links (e.g., SS7 telecommunications links) or network elements (e.g., an STP pair), and are adapted to capture certain data regarding user traffic. The captured data is in turn provided via a wide area network or other transmission means to a message processor. The message processor collates raw messages received from the data capture devices and produces roamer visibility and fraud data. This subscriber-related data can be used to populate one or more databases available for query by on-line client workstations, or may, in the case of fraud-related data, be provided as a wire feed or other transmission to a fraud detection system or other wireless service providers. Before providing fraud data, redundant data is eliminated.

41 Claims, 14 Drawing Sheets

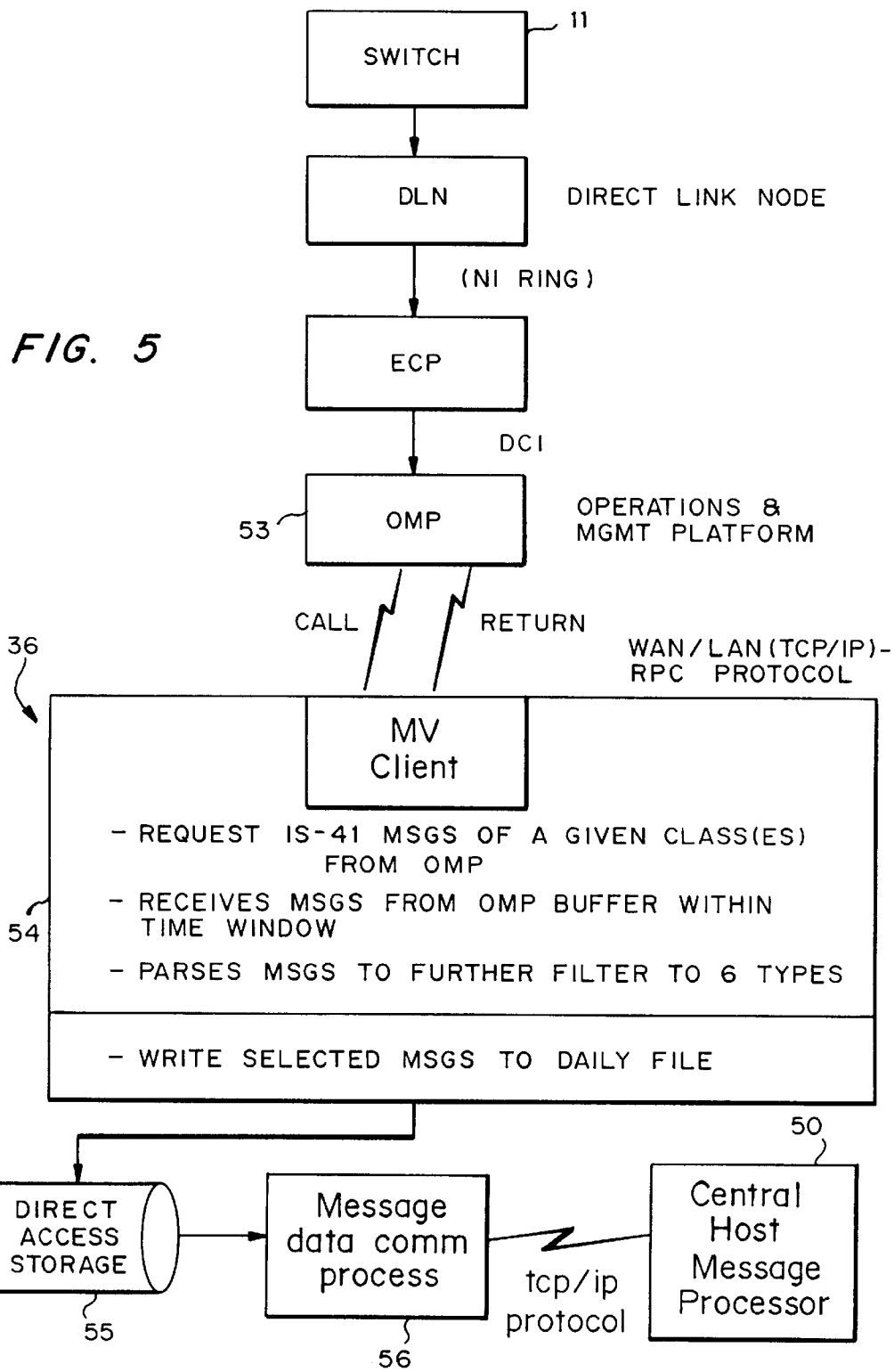

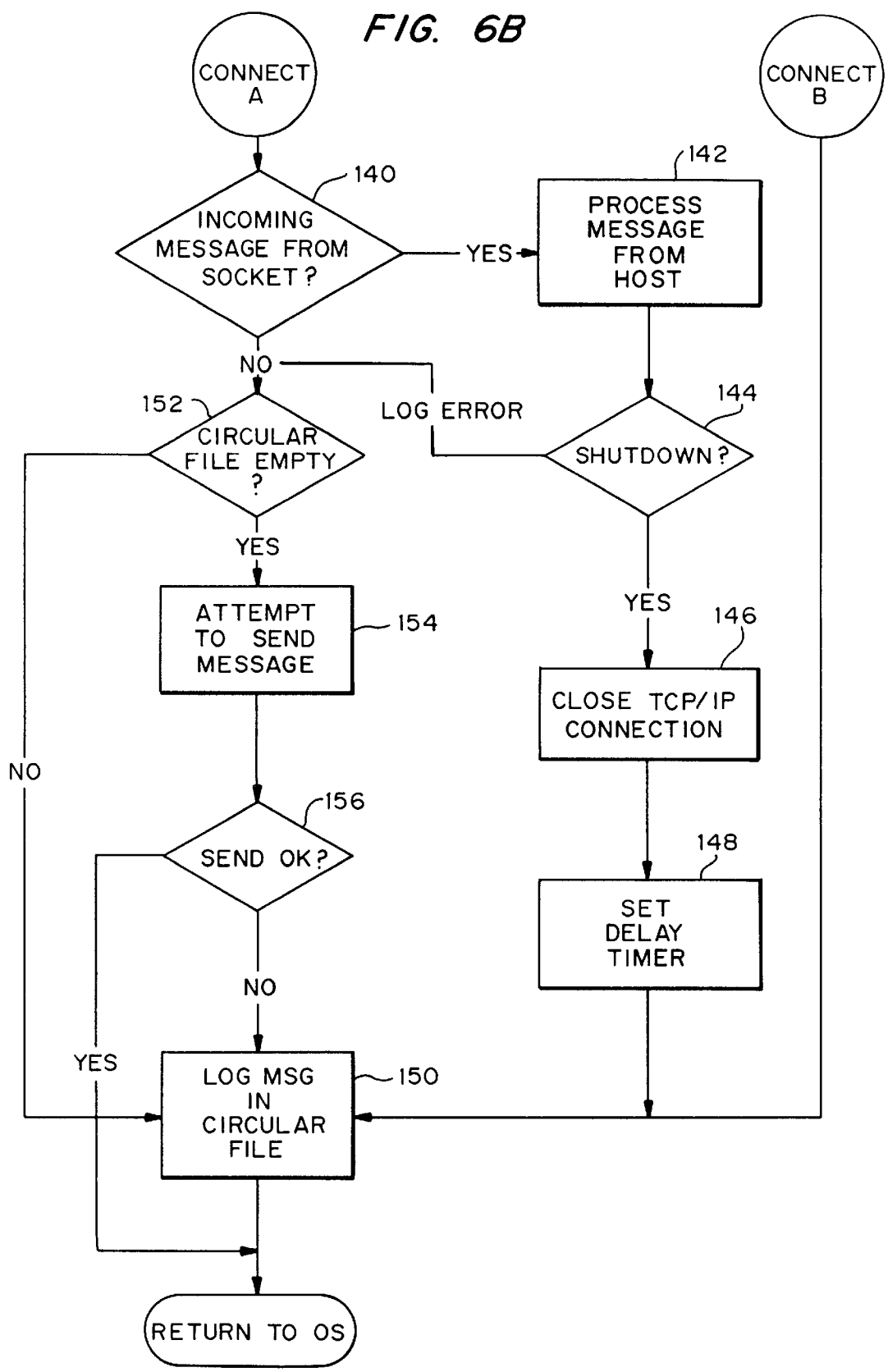

FIG. 7A

Packet:

| HEADER | DATA |
|---|---|
| 19 BYTES | VARIABLE LENGTH |

FIG. 7B

Header:

| STS ID | LINK NUMBER | OPCODE | MESSAGE TYPE (FLAG) | SEQ NBR | TOTAL MSG LENGTH |
|---|---|---|---|---|---|
| 3 BYTES | 3 BYTES | 1 BYTE | 1 BYTE | 6 BYTES | 5 BYTES |

FIG. 7C

Data:

| TIMESTAMP | TCAP TID | DPC/OPC | IS-41 MESSAGE |
|---|---|---|---|
| 4 BYTES | 4 BYTES | 6 BYTES | VARIABLE LENGTH |

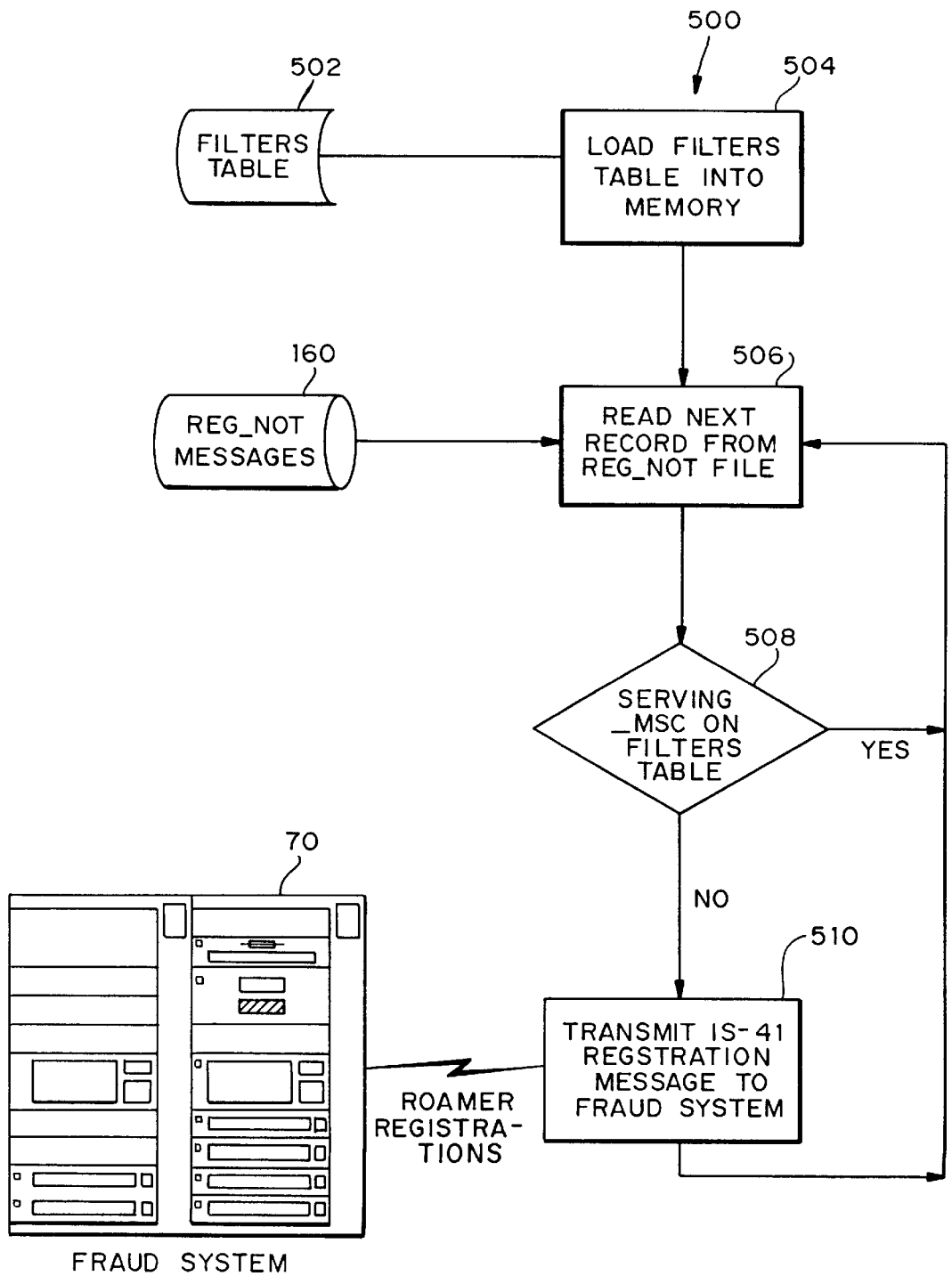

APPARATUS AND METHODS FOR PROVIDING WIRELESS SYSTEM FRAUD AND VISIBILITY DATA

FIELD OF THE INVENTION

The present invention relates in general to the field of telecommunications and in particular to the field of wireless telecommunications systems administration.

BACKGROUND OF THE INVENTION

The market for telecommunications services has grown at an extraordinary pace, and perhaps the greatest growth has occurred in the market for wireless communications, including cellular networks and personal communication systems.

Conventional wireless telecommunication systems employ numerous independent cellsites ("cells"). Each cell covers a designated geographic area and is connected via a dedicated network (usually leased lines or microwave) to a Mobile Switching Center ("MSC") that is in turn connected to the Public Switched Telephone Network ("PSTN"). The MSC handles all call processing intelligence, switching functionality, fault detection and diagnostics. MSCs are also integral to the operation of recently developed Personal Communication Systems ("PCSs"), another type of wireless system. A PCS utilizes numerous "microcells" that blanket a high use area, or an area where terrain features limit transmission capabilities (e.g., a downtown office district with tall buildings.) Because of the greater number of cells, the PCS can handle a significantly greater volume of traffic. Located within each PCS microcell is a low power transmitter. After receiving the subscriber's signal, the low power transmitter communicates (normally via microwave, PSTN, or data lines) with a controller. The controller, in turn, communicates with the MSC. Each PCS or cellular network covers only a specified "home" geographic area. Consequently, as the mobile user moves out of the home area and into a "foreign" area, telecommunications service is provided by a "foreign" wireless service provider typically not associated with the user's home wireless service provider. Operation in a foreign area is known as "roaming."

The deployment of Signaling System Number 7 ("SS7") networks for wireless systems like PCS or cellular networks has permitted carriers to supply a number of new applications to wireless systems' customers. SS7 is a highly flexible common channel signaling standard specifically designed for providing circuit and database related message flow control in networks. The feature enhancements to services made possible SS7 have accelerated its deployment. But most cellular systems continue to use services furnished by outside network providers. The high price of those services has tended to lead wireless services providers to deploy their own SS7networks.

The fees associated with the use of network services provided by third parties, which may be charged on a per transaction basis, lead to higher consumer prices for wireless communications services. The cost of paying network providers to operate a SS7 or other network, and the consumer prices they result in, may represent a serious constraint on wireless growth. An additional impediment to growth in the market for wireless services is the absence of a seamless roaming environment. In a seamless roaming environment, enhanced communications services are provided to mobile subscribers as they move about the nation (or, more optimistically, through various parts of the world), without diminution in service as one crosses boundaries between service providers.

Fraudulent uses of wireless systems pose an even greater threat to growth of wireless communications. For example, industry fraud losses exceeded an estimated four hundred million dollars in 1994.

Geographic expansion of services permitted by the creation of a nationwide network has accelerated the already significant cellular fraud. The incidence of fraud has significantly worsened as carriers allow users to make calls from anywhere in the country. Losses for 1995 are estimated at over one and a half million dollars per day. Growth in fraud losses for the first time exceeds industry growth.

Indeed, some wireless service providers have been forced by the overwhelming costs of fraud to suspend roaming service in foreign areas where its incidence is high. Preventing or minimizing the fraudulent use of wireless systems is therefore a necessary precondition to putting the industry back on a solid growth track and developing a nationwide network providing seamless roaming.

Two types of fraud are prevalent. One is "cloning fraud," in which a valid customer's mobile identification number ("MIN") and/or electronic serial number ("ESN") are "cloned" or copied into another cellular set. Most typically, cloning fraud is perpetrated in a foreign service provider's network. Even when the fraud occurs outside of the home service provider's network, the home service provider remains liable for the fraud, the costs of which directly diminish the service provider's revenue.

A second typical fraud problem involves subscribers who are not entitled to service (e.g., because they have failed to pay their bills or obtained service under false identities, etc.), but who nevertheless attempt to obtain roaming service in a foreign service provider's wireless system. Roaming involves a validation process to determine if the roamer is legitimate in its home system. The switches of systems located geographically close to one another are often coupled because those systems' customers will frequently roam into the adjacent area. These systems can directly communicate with one another to exchange validation requests and fraud control data. In any event, even if some switches of different systems were coupled, those switches may nevertheless be unable to communicate with one another to exchange validation requests and fraud control data for the simple reason that the switches may be incompatible with one another. As a result, a national clearinghouse system for handling fraud and roamer management has arisen.

A national clearinghouse typically has a database containing so called "negative files" including lists of stolen phones and cloned MINs. The typical clearinghouse also couples to the MSCs of subscribing systems in order to access subscriber data, usually called the HLR or Home Location Register, to validate subscribers for whom services are being requested in a foreign market whose service provider is also a member of the clearinghouse network. A national clearinghouse is capable of providing on-line support as well as a data feed. The clearinghouse validates customers prior to allowing a request for telecommunications service to proceed. But by the time the clearinghouse checks its own database and then, if necessary, the database of the subscriber's carrier, the foreign carrier may already have permitted a fraudulent roaming communication to occur.

In order to detect "cloning fraud," a service provider may use, among other methods, a fraud management system that develops usage profiles. These profiles are based on the communications traffic information for particular customers and are obtained from billing records and other sources. If a call does not match the customer's profile, an analyst may contact the customer. A fraud detection system (like Clone-Detector available from GTE TSI (Telecommunications Services Inc.)) analyzes calling patterns to identify calls made close in time using identical MINs in widely-separated geographical areas. This type of condition generally indicates that one of the MINs is a clone. The customer corresponding to the MIN is contacted for confirmation and appropriate steps are taken to lock the clone out of the system.

Some clearinghouses are presently attempting to offer both fraud detection systems and customer on-line support systems intended to react in real time. Clearinghouses charge each subscribing service provider a per-transaction fee for providing fraud management services and also charge for certain on-line support data. In addition to charging transaction fees, clearinghouses incorporate each subscribing service provider's valuable and commercially sensitive customer information into a central pool within its exclusive control. Clearinghouses provide needed roamer visibility. But subscribing service providers lose the ability to obtain data on their own network transactions if they choose not to utilize the clearinghouses for validation for particular transactions if they choose not to utilize the clearinghouses for validating particular transactions. Data of this sort is critical, not only for network operation, but also for purposes of planning and marketing. Understandably, subscribing service providers also prefer to maintain control over their own customer profile and system traffic information. They thus prefer to eliminate the clearinghouse service and directly manage user validation for their own networks in order to eliminate the transaction fees charged by the clearinghouses and obtain their own on-line support data.

Subscribing service providers can circumvent the clearinghouse services by networking their switches with switches in foreign service providers' systems. This process is facilitated by deployment of SS7 networks, coupled with the advent of IS-41. IS-41 is an interim standard created by the Electronic Industry Association/Telecommunications Industry Association ("EIA/TIA") that permits switches produced by different manufacturers to communicate with one another. IS-41 enables the switch of a home system of a roaming subscriber to communicate with a foreign system providing services to the roaming subscriber in order to transmit validation and customer profile information. IS-41 messages may be transported over SS7 networks that many service providers are already connected with or soon will be deploying. Other standards may be developed and will likely also be capable of transmission over SS7 networks. Using such standard message formats and protocols, switches belonging to differing service providers become capable of requesting validation data and exchanging customer profile information. This information sharing not only eliminates the high transaction charges associated with a national clearinghouse, but it also returns control of valuable, proprietary customer profile information to the service providers.

Since many such fraud detection systems (such as GTE'S) obtain fraud control and customer support data feeds from links between an individual MSC and clearinghouse, as wireless service providers connect their switches directly using SS7 or another network, the data traffic occurring between such interconnected switches is no longer "visible" to the clearinghouse system. In other words, clearinghouse systems often cannot obtain information on transactions involving wireless service providers whose switches are coupled directly to each other via the SS7 network.

Obviously, this is a problem that directly impedes clearinghouses ability to provide accurate and comprehensive fraud control and customer support data. The problem will accelerate as more service providers interconnect via SS7 or other networks. Such interconnections will increase as service providers take advantage of the flexibility of the SS7 network and new standards like IS-41 in order to interconnect directly with other service providers in adjacent geographic regions or in high use metropolitan areas frequented by business or tourist travelers.

Further, with the advent of SS7 networks, future service enhancements are likely. Those enhancements should be provided without disrupting fraud data feeds and other customer service operations; current systems do not eliminate or minimize disruptions, however.

As wireless service providers link their switches and move toward a nationwide network, "they will bypass the traditional methods of capturing roamer messages. They will have to assume more responsibility for insuring that the systems they use provide the required level of message visibility to maintain superior customer service and roamer management—especially as more customers are roaming and using additional enhanced services." Rolando Espinosa, "The Industry's Most Important Challenge: Cellular Signaling Network Management," Telephony, Vol. 227 at 27 (Aug. 22, 1994.) The ongoing and projected future conversion to SS7 networks therefore requires new methods and systems to extract fraud control and customer support information.

Even for service providers that may not adopt the SS7 or other standard network protocols, fraud control and customer on-line support systems furnished by outside providers suffer from drawbacks, both technical and financial. Among their technical shortcomings, the systems may not provide the full fraud data feeds necessary for minimizing and managing network fraud. Nor do the systems provide complete message "visibility"—information on transactions with some of the carrier's closest roaming partners may not be obtained and transmitted to either the fraud control or customer support systems. Financially, reliance on outside network providers for fraud control and customer support systems costs service providers significant ongoing transaction fees.

SUMMARY OF THE INVENTION

The present invention provides apparatus and methods for capturing information relating to communications traffic from one or more wireless telecommunications systems, and for processing the captured information at a message processor to produce roamer visibility and fraud data useful in administering such systems. A monitoring and data capture platform or subsystem monitors each of the telecommunications links coupling a Mobile Switching Center ("MSC") or network elements like Signal Transfer Points or particular types of MSCs directly. This data capture subsystem may be configured to capture selected data pertaining to wireless telecommunications, including any number of desired call control and processing messages, depending on the type of data desired for roamer visibility, fraud control engineering, customer support or other functions of importance to wireless service providers, whether they provide cellular, PCS or other wireless communications network services. The selected data, typically in the form of messages in an operative protocol (e.g., the IS-41 protocol), can then be buffered for analysis or transmission. The selected data can be formatted and transmitted to (1) a message processor subsystem for further processing or (2) directly to a fraud system, customer support system, or other administrative instrumentality for further analysis or use.

Similarly, a method associated with the data capture apparatus furnishes visibility and/or fraud data relating to wireless communications based on related message traffic. Signals pass through various network elements like a Signal Transfer Point ("STP") pair or switch and are transmitted over at least one telecommunication network link coupled to at least one wireless switching center. A data capture device is coupled to at least one of the links or one of the network elements. Links or network elements are monitored for messages of interest, such as a message belonging to a preselected (and changeable) set of message types.

According to the method, signals containing messages relating to wireless telecommunications traffic are read off of at least one of the telecommunications links. Messages pertaining to wireless traffic are identified, and, of these messages, those belonging to a preselected (but changeable) set of message types are selected. Selected messages are then forwarded to an administrative instrumentality. The administrative instrumentality may be a message processor that further processes messages received from a plurality of data capture devices to collate messages or filter out from the incoming data stream messages redundant to those already provided by an outside source. Alternatively, message processing can be done at the data capture device and messages forwarded directly to other administrative instrumentalities like a fraud detection system, customer on-line support station or any other end-user capable of operating upon the captured messages.

In an illustrative embodiment of a system according to the present invention, the data capture subsystem is configured to transmit the selected data to a message processor for further processing to yield useful visibility and fraud data. (Generally, "visibility data" is wireless system data that identifies subscriber roaming activity between wireless systems. An example of some of the visibility data generated is the location and system usage of roaming subscribers.) The message processor stores selected incoming messages from the data capture subsystem in a memory location. The message processor then collates received messages with the stored messages to provide roamer visibility, fraud, or other useful administrative data. This data may be made available for query by on-line customer support workstations that may display the forwarded data on a real-time basis. Additionally, the message processor processes incoming captured messages and extracts certain data for transmission to a fraud detection or control system in the form of a data feed, for example.

A data capture portion of an embodiment of the present invention thus generates a set of wireless telecommunications visibility and/or fraud data based on messages transmitted over at least one telecommunications link or through various network elements. The visibility or fraud data is for use by an instrumentality in monitoring, servicing or otherwise administering a wireless telecommunications system.

One embodiment of a data capture apparatus comprises a link capture device that includes at least one telecommunications link interface; each link interface corresponds and couples to a telecommunications link for reading signals off the link. A processor may be coupled to the link interface and may be programmed for any of the following tasks: retrieving signals read by the telecommunications link interface; identifying messages in the retrieved signals; selecting messages belonging to a preselected set of message types of interest; and formatting the selected messages for transmission to the administrative instrumentality.

Alternative embodiments of data capture apparatus exist for capturing messages of interest from message traffic in wireless systems.

For example, rather than read messages off of telecommunications links, message traffic through a Signal Transfer Point ("STP") can be directly monitored and messages of interest captured. Preprocessors provided for each of a pair of STPs read appropriate message traffic and, after reformatting, forward selected captured messages to a merge processor. The merge processor combines captured messages and forwards them to the message processor.

Alternatively, for MSCs (particularly those manufactured by AT&T) operating with a proprietary protocol (AT&T's protocol is called EFTN) the proprietary intra-switch messages can be "translated" to a standard format (e.g., IS-41). A switch message capture device, implemented in a separate processor or resident on a portion of the message processor, can obtain from the switch "translated" proprietary messages corresponding to messages of interest passing through, translated at and buffered at the switch. (To translate EFTN a software package may be obtained from AT&T and deployed at the switch of interest.) Captured messages are then transferred to an appropriate other portion of the message processor. (Absent this alternative embodiment of data capture device, messages in AT&T's proprietary EFTN format would not be captured since other data capture devices could not recognize the messages of interest given their proprietary format.)

A message processor may generate system fraud and roamer visibility data for use by a service provider in administering its wireless systems and detecting fraud. A portion of the message processor is in communication with at least one data capture device (as described herein), or other device, for capturing from a wireless system messages indicative of wireless system traffic, the messages corresponding to a number of classes. As an example, there may be a first class of "challenge" messages and a second class of "response" messages; these may be typical of any system that uses a query/response (or "ACK"/"NACK") certified delivery method. In wireless systems using IS-41 protocol, the first class of challenge messages would be an "invoke" message; the second class of response messages would be a return result messages.

At least one input port on the message processor may receive messages pertaining to wireless traffic from the data capture device or, if the message processor is centrally located, a plurality of data capture devices. The message processor may be coupled to at least one memory location. (The phrase "memory location" means a memory or data storage device of any sort, or a portion of such a device.) The message processor is programmed to: receive messages indicative of wireless traffic from a data capture device and store in the memory location received messages that belong to the first class. For each received message belonging to the second class, the message processor searches the memory location for a previously stored first class of message related to the received message. If any message located in the search is related to the received message of the second class, the message processor collates the received message with the located message, and provides the collated messages to an enduser or a processor.

A method associated with processing captured messages includes: receiving messages indicative of wireless traffic from the data capture device; storing the received messages belonging to a first class of message (e.g., IS-41 invoke messages) in the memory location; for each received message belonging to a second class (e.g., IS-41 return result messages), searching the memory location for a previously stored message of the first class related to the received message and, if any message located in the search of the memory location is related to the received message of the second class, collating the received message with the located message. Finally, the collated messages are provided to an end-user. Optionally, collated messages may be "filtered" to eliminate those messages already being provided by a third party fraud or customer support system.

Generally, the message processor may be centrally located and in communication with various data capture devices via a LAN, WAN or equivalent communication path. Central location allows for easier changes to the functionality implemented by the message processor. Nevertheless, the message processor may also be deployed with and connected directly to each data capture device. This would free up valuable system bandwidth since raw, unprocessed messages will not be sent, as is the case with a centrally located message processor.

A system for capturing desired messages from a wireless system that uses a preselected signaling system and preselected protocol thus includes data capture devices that (i) monitor wireless system message traffic through various network elements or across at least one network telecommunications link and (ii) select from the monitored messages those corresponding to a preselected set of message types. The system also includes a message processor coupled by a transmission path or directly to the data capture device(s) and programmed to collate selected messages with one another to produce records associated with the wireless telecommunications traffic, as well as means for providing such records to an end-user.

Indeed, if desired, the present invention could be used not only to capture messages of interest but also to monitor for messages of interest. Tallies of messages of interest could then be processed to create various statistics relevant to network traffic and extremely helpful to network engineering or customer support and marketing.

Accordingly, the present invention provides visibility data at a low cost as well as data to maintain or improve the effectiveness of existing fraud detection systems. Adopting the present invention avoids interrupting fraud investigation if the wireless system replaces an X.25 or any other existing network, including a SS7 network operated by an outside network provider, with its own SS7 or other network. Using the present invention, fraud control systems can be deployed in other markets without relying on third-party network operators and without losing roamer visibility when a carrier utilizes a selected protocol, such as SS7, to transport validation transactions. Presently deployed wireless systems will enjoy enhanced productivity benefits flowing from the provision of more detailed, yet real time, customer support, network traffic engineering or other administrative information. By implementing the carefully designed on-line support system, wireless providers will nevertheless receive just the right amount of data of interest, thus optimizing use of valuable system bandwidth.

It is accordingly an object of the present invention to provide a data capture device for monitoring and capturing a variety of information on telecommunications traffic within a wireless system.

It is an object of the present invention to provide a plurality of data capture devices, some of which capture data from a telecommunications link, others of which are coupled to particular network elements from which data of interest is captured.

It is a further object of the present invention to provide captured data to an administrative facility, such as a central message processor, where the results are collated or otherwise processed to yield roamer visibility, fraud, or other data useful in the administration of a wireless system.

It is an additional object of the present invention to provide a message processor for (1) receiving messages captured by data capture devices coupled to telecommunications links or network elements in a wireless system and (2) processing the received messages to yield paired IS-41 or other messages that provide roamer visibility and data useful in the detection of fraud.

It is another object of the present invention to provide a central message processor including a database containing roamer visibility data available for query by one or more on-line customer support systems.

It is a further object of the present invention to provide methods and apparatus for providing a central message processor for processing captured messages as well as fraud data received from outside or third party providers to generate a fraud data feed from which redundant fraud-related information has been removed.

Other objects, features and advantages of the present invention will become apparent upon reading the remainder of this document.

BRIEF DESCRIPTION OF THE DRAWINGS

FIG. 5 is a block diagram and flowchart illustrating yet another embodiment of a data capture device that captures data from a switch using a manufacturer's proprietary protocol.

FIG. 6B is a flowchart illustrating a second portion of the logic flow associated with a real time decoding function implemented by a data capture device.

FIG. 7A illustrates the format for a data packet carrying a message captured by a data capture device.

FIG. 7B illustrates the format for a header portion of a data packet carrying a message captured by the data capture device.

FIG. 7C illustrates the format for a data portion of a data packet carrying a message captured by the data capture device.

FIG. 11 is a flowchart illustrating the logic flow of filtering captured data collected according to the present invention.

In the flowcharts in this document, neither the particular breakdown of the logic into steps, nor the specific ordering of the steps, are required for implementation of the invention. Rather, the flowcharts provide one illustration of the operational logic of the invention; other implementations consistent with that logic could also be relied upon to practice the present invention. That the logic is illustrated in certain of the Figures according to a serial processing model, as opposed to, say, an object-oriented approach, is intended only for clarity of discussion, and does not limit the invention to a particular implementation approach.

DETAILED DESCRIPTION OF THE DRAWINGS

System Level Overview

Figure 1:
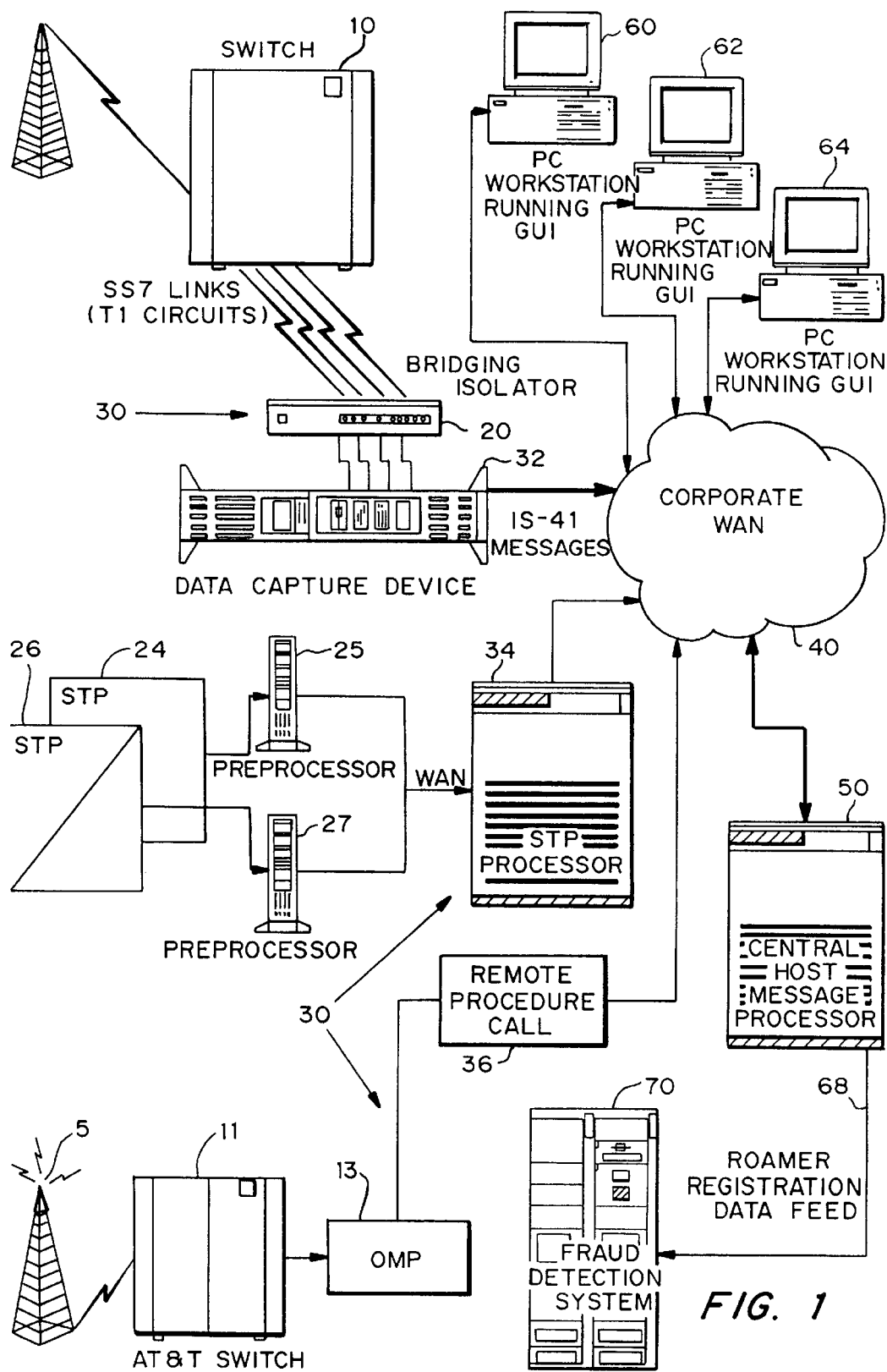
FIG. 1 is a schematic illustration of the architecture of an embodiment of a system for capturing fraud and customer data relating to a wireless telecommunications system according to the present invention.

FIG. 1 presents a high-level overview of the architecture of a system including apparatus and methods for capturing fraud and customer-related data from a wireless system according to the present invention. The system and the methods carried out by the system include two main components: (1) data monitoring and capture; and (2) generation of visibility and fraud data from captured messages.

Representative switch 10 of a wireless telecommunications system may be a mobile telephone switching office (MTSO), MSC or other known mechanism for switching wireless telecommunications traffic from or to one or more wireless devices, an example of which is represented by antenna 5. Switch 10 couples by one or more links to corresponding elements of a public or proprietary network operating under a signaling standard, such as the SS7 standard. The switch 10 may be used by a cellular or PCS company to transport wireless validation transactions (using, e.g., a protocol like IS-41) on a switch-to-switch basis, rather than by resorting to a clearinghouse to perform validations. For purposes of this description, but without limitation, reference will be made to the SS7 signaling standard and to the IS-41 interim standard. (The Electronic Industries Association/Telecommunications Industry Association ("EIA/TIA") has published Interim Standard 41, Revisions A, B and C. Copies of these are available from the Electronic Industries Association, 2001 Pennsylvania Ave., N.W., Washington, D.C. 2006. The IS-41 standards, including all revisions, are hereby incorporated in their entirety by this reference.) Nevertheless, the system is in no way limited to functioning in the context of these standards, but could just as easily be adapted to work with networks operating under other signaling or interim messaging standards.

Figure 2:
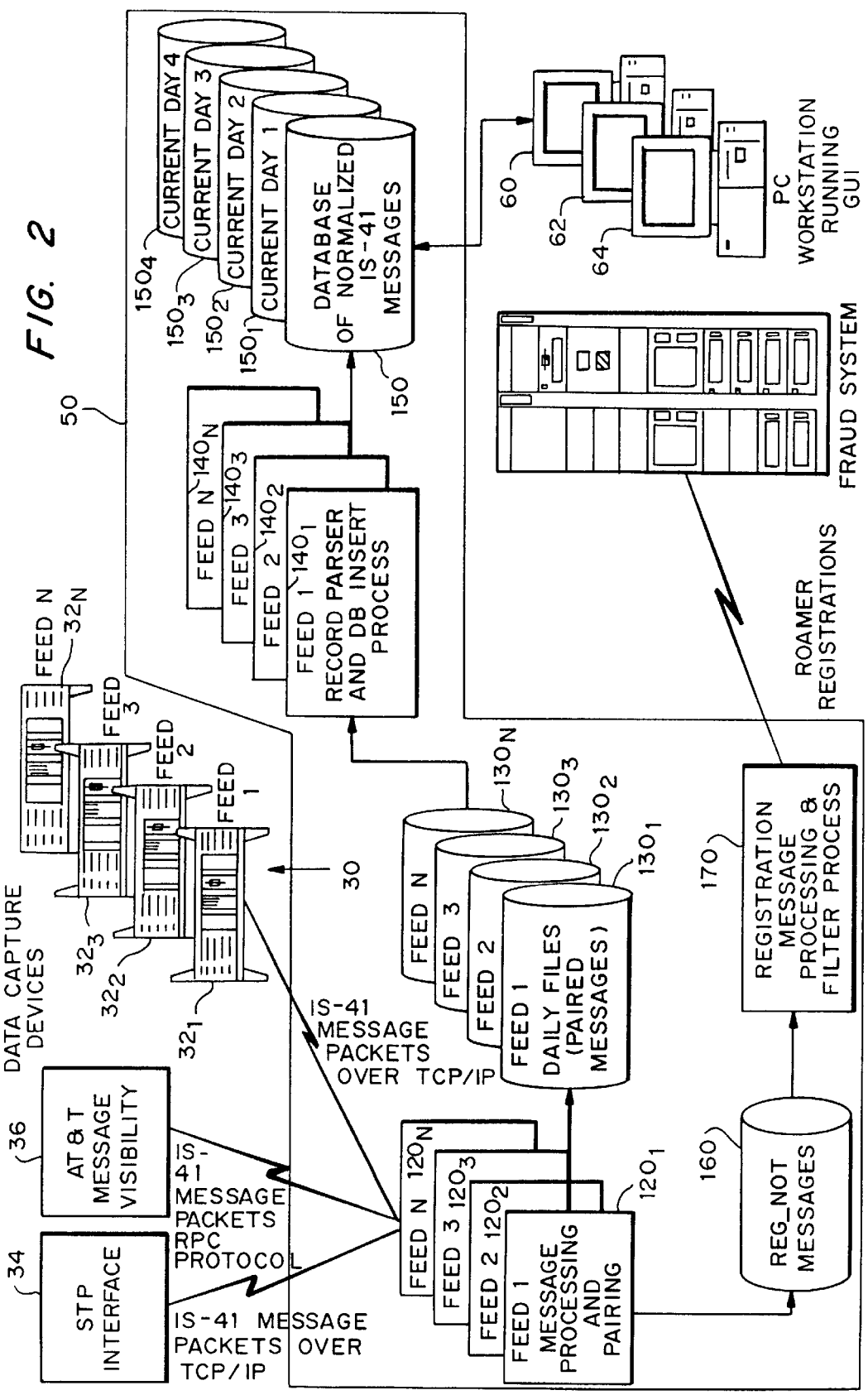
FIG. 2 is a schematic illustration of data flows associated with the system architecture illustrated in FIG. 1.

Various embodiments of data capture devices 30 are shown in FIGS. 1 and 2. Thus, link capture device 32, STP capture device 34 and switch capture device 36 each comprise a data capture device 30. Each can identify messages of interest out of a number of signals indicative of wireless traffic over a wireless telecommunications system. Output from a particular data capture device 30 is forwarded to a central message processor 50 by any suitable means for transporting digital data. For example, but without limitation, data retrieved and processed by link capture device 32 may be made available on a local area network (LAN), such as an Ethernet LAN, or over a corporate wide-area-network (WAN) 40, as illustrated in FIG. 1, to the central message processor 50.

Data capture devices 30 may monitor the wireless systems for any wireless traffic, including IS-41 messages, SS7 messages or TCAP messages. Wireless traffic is buffered, individual messages identified and messages of a particular type of interest are selected. For example, assuming the network transports messages in an IS-41 standard format, any embodiment of data capture device 30 can identify and capture the following set of IS-41 messages:

1. Registration Notification ("REG_NOT")
2. Qualification Request ("QUAL_REQ")
3. Qualification Directive ("QUAL_DIR")
4. Service Profile Request ("SRV_PRF_DIR")
5. Service Profile Directive ("SRV_PRF_REQ")
6. Return Result IS-41 return result messages do not indicate the invoke message type to which they correlate. Accordingly, monitoring and capturing of all return results messages may be necessary to ensure that later message collating produces complete message sets that identify a wireless system transaction.

Alternative embodiments allow other or additional sets of message to be captured. Alternative message types (and their functions) are described in the IS-41 standards previously incorporated by reference. Message sets may be selected for gathering not only data for customer support and fraud management, but also for network engineering. For example, message sets dealing with call setup or call feature activation may be chosen. Appropriate IS-41 messages, like Route Request that gives the dialed digits and destination, would be chosen to fill in this set, in which network engineering might be interested.

Generally, changing to a different message set is done simply by identifying which set of messages is to be captured and informing data capture device 30 of that set by software exchange (e.g., by providing a system disk or modem upload of the new message set of interest.) Also, if the invention is implemented with other than an IS-41 standard in place, messages analogous to those listed above could be gathered by data capture device 30. In any event, a set of captured and identified messages may be formatted into TCP/IP packets, as seen in FIGS. 7A–7C, and forwarded to central message processor 50 for further processing.

The central message processor 50 is preferably a facility for receiving data handled at a plurality of switches (not shown) and captured by corresponding data capture devices 30 similar or identical in function to link capture device 32, STP capture device 34 or switch capture device 36. IS-41 (or other) messages captured from SS7 links at switches 10 by these data capture devices 30 may be provided to the central message processor 50 via any suitable means, but in the preferred embodiment are sent in packets over a WAN 40 running the TCP/IP protocol. Central message processor 50 aggregates, stores, and processes the received IS-41 messages in order to provide coordinated customer-related visibility and fraud data, as will be described in detail below.

Messages captured by data capture device 30, and processed by central message processor 50 to yield useful data for visibility and fraud analysis, can be made available for query by one or more client customer on-line stations (several of which are indicated by reference numerals 60, 62 and 64) via WAN 40. These customer on-line stations are thereby provided with visibility data for roaming wireless service subscribers, enabling on-line customer service representatives (operating on-line stations 60, 62, 64, etc.) to provide quick, high quality and responsive service to subscribers of (or roamers using) the wireless system. Furthermore, fraud data in the form of a roamer registration feed culled from each switch, of which switch 10 is a single example, may be processed by captured data processing device 50 and provided to a fraud detection system 80 via an appropriate link 68.

FIG. 2 illustrates representative data flows between components of the embodiment shown in FIG. 1. Link capture device 32 monitors each link to which it is coupled for any message that belongs to a set of IS-41 message types useful for customer on-line support and fraud data feed purposes. In FIG. 2, N link capture devices $32_1$, $32_2$, $32_3$, through $32_N$, each receive a corresponding feed from an SS7 link for a particular switch. Also, STP capture device 34 receives a captured data feed from a pair of STPs 24 and 26 and switch capture device 36 receives a captured data feed from AT&T switch 11 that operates via the proprietary EFTN protocol. As described in connection with FIGS. 3–6, the link capture devices $32_{1-N}$, STP capture device 34 and switch capture device 36 each retrieve IS-41 messages and format the messages into packets (one format for which is described in connection with FIGS. 7A–7C, below.) The resulting packets are transmitted to the central message processor 50 via an appropriate transmission means, such as a corporate WAN 40 supporting the TCP/IP protocol, or other suitable path.

For example, but without limitation, the central message processor 50 may be implemented by a Hewlett Packard HP 9000 K400. The central message processor 50 preferably includes a subprocessor corresponding to each link capture device $32_{1-N}$, STP capture device 34 and switch capture device 36 for receiving and processing received IS-41 message packets. Each of the subprocessors of central message processor 50 preferably runs in parallel a set of message pairing and processing procedures $120_{1-N}$, each corresponding to the message feed received from a particular data capture device 30 over WAN 40. The operations of these procedures are discussed below in connection with FIGS. 8–10.

Each message processing and pairing operation $120_{1-N}$ writes its results to an associated daily file $130_{1-N}$ that contains paired IS-41 invoke and return-result messages for a particular day. The same process also detects registration notification messages (Reg__Not) and writes them to Reg__Not file 160.

Records in the daily files $130_{1-N}$ containing paired message data are parsed by associated record parsing and database insertion processes $140_{1-N}$. These processes $140_{1-N}$ each insert their results into a database 150 of normalized IS-41 messages. Database 150 may be implemented by a suitable, commercially available database, such as (without limitation) an Informix Software, Inc. relational database. Other suitable databases, such as those marketed by Sybase and Oracle might also be used. Results inserted into database 150 preferably are also organized by day, so that previous days' results are available: paired messages for the day prior to the current day may be stored in a database table $150_1$; for the day two days prior to the current day may be stored in database table $150_2$; through a period N days prior to the current day may be stored in a file $150_N$.

IS-41 messages typically contain information regarding the origination and timing of message generation. Thereby, the central message processor 50 can process paired message (and expired invoked messages) to sort them by day and occurrence of call. Sorted message are then indexed, segmented by date and stored in the database 150. Database 150 thus provides comprehensive visibility data available for query according to known techniques by customer on-line workstations, e.g., workstations 60, 62, and 64.

The registration notification (Reg__Not) messages stored in Reg__Not file 160 are processed and filtered according to a procedure 170 described in detail in connection with FIG. 11. The resulting filtered data may be provided via link 68 as a fraud feed comprising roamer registrations. This fraud feed can be used by existing fraud detection systems, such as fraud system 70, to detect various instances of fraudulent system use.

Data Capture Devices

Figure 3:
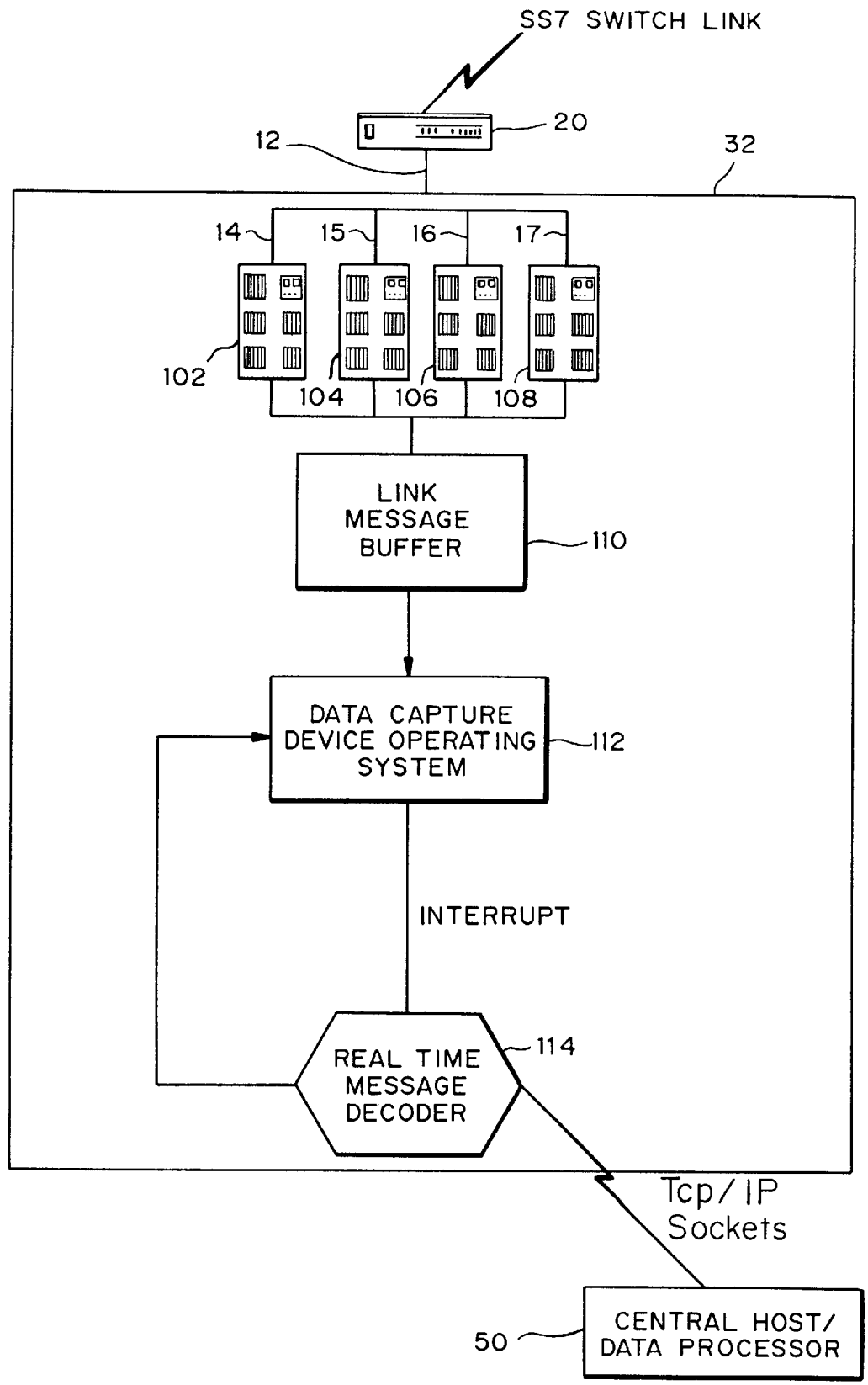
FIG. 3 is a block diagram illustrating signal links, interfaces and functionality of an embodiment of a data capture device and method for capturing fraud and customer data from a wireless system according to the present invention.
Figure 4:
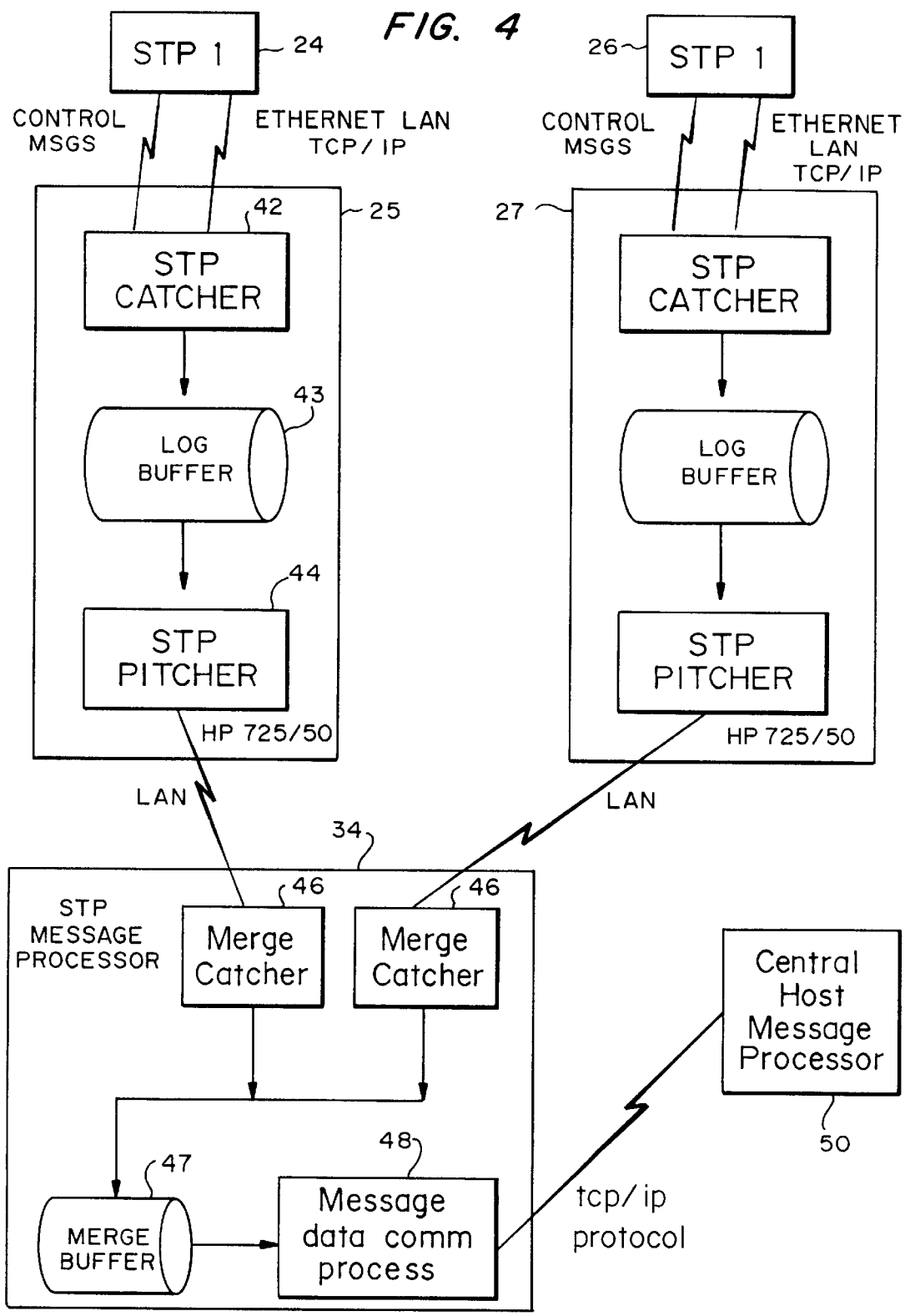
FIG. 4 is a block diagram indicating the functionality and components of another embodiment of a data capture device for coupling to STPs.

FIGS. 3–5 illustrate the components and functionality of various embodiments of data capture devices 30.

FIG. 3 shows the data links and functionality of an embodiment of a link capture device 32 and one method for capturing fraud and customer data from a wireless system according to the system as illustrated in FIGS. 1 and 2. Generally, each SS7 link may be passively monitored, and desired portions of the monitored traffic, like particular IS-41 messages, may be captured without disrupting the functioning of the switch 10. In particular, a suitable link capture device 32, implementations for which are described below, is coupled to the switch 10 via a bridging isolator 20. Bridging isolator 20 is coupled to one or more links of the SS7 network of which the switch 10 forms a part. Bridging isolator 20 may be (without limitation) a HP15821A Multiple Balanced Bridging Isolator manufactured by Hewlett Packard, or any suitable device capable of providing passive balanced resistive and transformer isolation between the link capture device 32 and the SS7 network. Link capture device 32 can be implemented, for example (but without limitation), by a HP 37900D Signaling Test Set, a protocol analyzer manufactured by Hewlett Packard Company. Other devices that may be suitable for performing the described link data capture function, if properly programmed to perform functions described below, are marketed by other vendors, including TecElec, Inet, Techno or Seimens.

Link capture device 32 passively monitors signals on the links accessed via bridging isolator 20, and extracts desired fraud and customer-related information, discussed below. To maximize its processing efficiency, the link capture device 32 preferably can monitor a plurality of signal links and can be programmed to perform specific tasks. For example, the HP 37900D may monitor up to four SS7 links and may be customized to conduct desired measurements and to process the gathered data, as will be further described below. If the switch 10 has a greater number of links than can be monitored by a single link capture device 32, more link capture device 32 can be used and incorporated into the system architecture. For example, if a link capture device 32 is implemented by a HP 37900D and the switch 10 handles nine SS7 network links, three data capture devices 30 would be required. But the number of input ports could just as easily be raised (or lowered) depending upon the specifications of the equipment implementing the link capture device 32. Thus, a link capture device 32 with additional link interface cards inserted in its chassis and additional processing power could be deployed.

FIG. 3 shows an SS7 switch data link 12 that includes four SS7 links coupled to bridging isolator 20. Each of four data lines 14–17 from bridging isolator 20 couples to an input port of link capture device 32. A telecommunications link interface 102, 104, 106 and 108 corresponds to each input 14–17. Each link interface 102–108 may be implemented by, for example, a signaling interface card, a T1 or V.35 interface card or any other suitable interface. In FIG. 3, link interface 102 couples to data line 14; link interface 104 couples to data line 15; link interface 106 couples to data line 16; and link interface 108 couples to data line 17. Each link interface 102–108 transduces the signal on the corresponding data line 14–17, making it available to be read, stored or otherwise manipulated by link capture device 32.

The operating system 112, running on an internal processor of the data capture device 30, monitors all active link interfaces 102–08. In one embodiment, but without limitation, the operating system functionality may be implemented by a Pascal 3.2 workstation system on, e.g., the HP 37900D. A daemon subprocessor of the operating system 112 listens for IS-41 messages on the link interfaces 102–108 and, when one is received, writes it temporarily to a link message buffer 110, where it may be stored (along with other such messages) according to a first-in-first-out (FIFO) discipline.

Figure 6A:
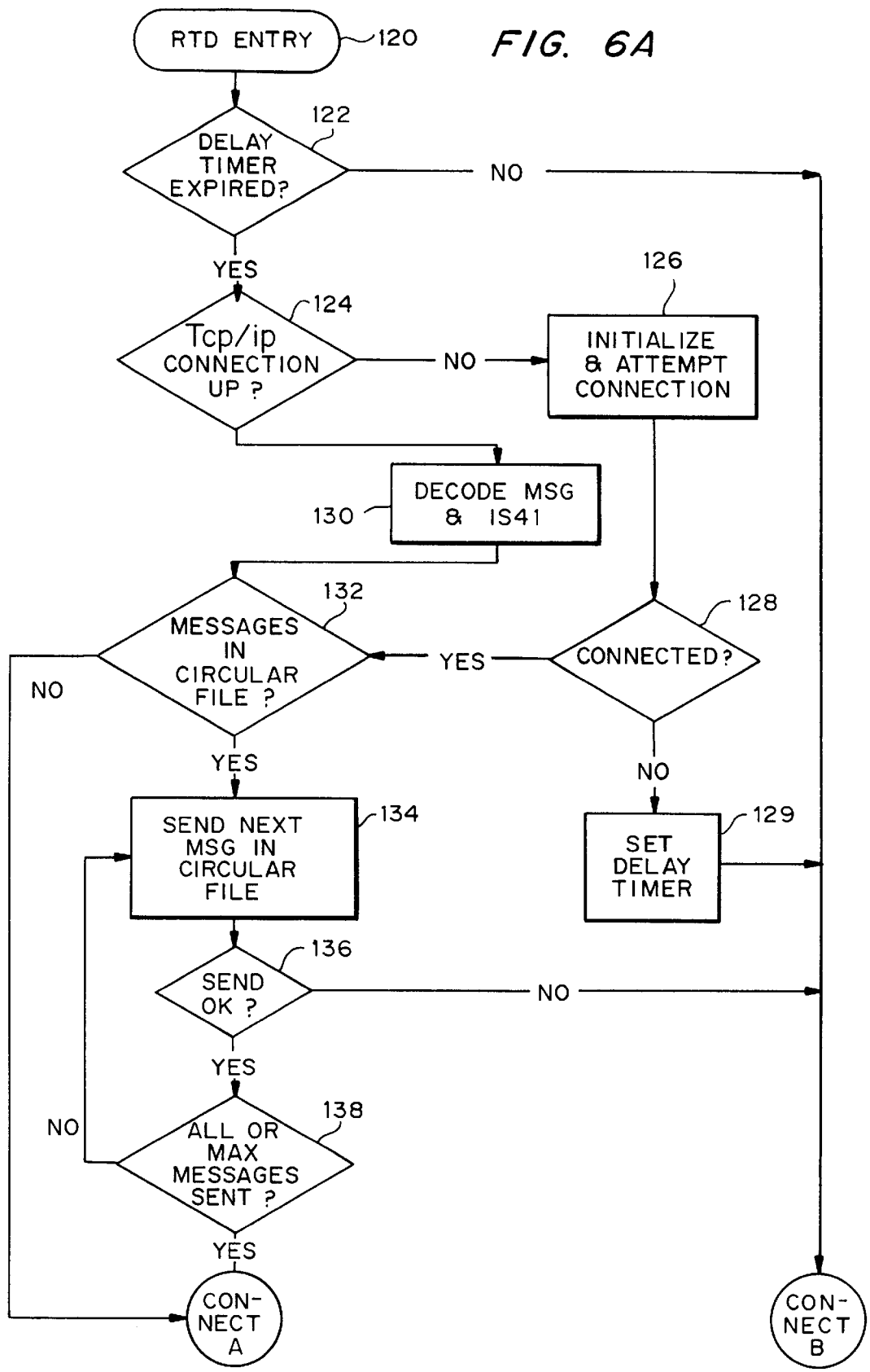
FIG. 6A is a flowchart illustrating a first portion of the logic flow associated with a real time decoding function implemented by a data capture device.

Upon the occurrence of a periodic interrupt, operating system 112 initiates a real time decoder process 114, the logic for an embodiment of which is provided in FIGS. 6A and 6B. In the period between interrupts, many IS-41 messages may have been received by the link interfaces 102–108 and temporarily stored in the link message buffer 110. The periodic interrupt permits the real-time decoder process 114 to retrieve captured IS-41 messages from the link message buffer 110 for processing and transmission to central message processor 50, as described in connection with FIGS. 6A and 6B.

FIG. 4 illustrates an STP capture device 34 that obtains messages of interest from STP pair 24, 26. Generally, a Signal Transfer Point ("STP") is a high-capacity packet switch that routes messages between network access nodes such as switches (MSCs) and databases (like SCPs). An STP typically comprises geographically separated pairs so that if one STP fails the other can handle total traffic volume (thus, the volume of message traffic for a single STP should never exceed fifty percent of its capacity.) Each STP 24, 26 in a pair has a preprocessor 25, 27. Preprocessors 25, 27 can be implemented on an HP 725/50 unix workstation. (Depending on the features the preprocessors 25, 27 implement, other properly programmed computers with less or even more processing power could be used to implement the preprocessor. For example, preprocessors with greater processing power could provide roaming or engineering reports as well as captured data.) Each preprocessor 25, 27 implements a daemon subprocessor called STP catcher 42 that reads messages from one or multiple LAN card(s) located at the corresponding STP 24, 26. STP catcher 42 filters the messages coming across the LAN card(s) and selects only those messages belonging to a desired type. Selected messages may be formatted (one format may be that shown in FIG. 7) and provided to log buffer 43. Daemon subprocessor STP pitcher 44 reads the buffer and transfers messages via a LAN or other communication medium to STP merge processor 35. Control messages exchanged between preprocessors 25, 27 and STP pair 24, 26 assure synchronization. (Control messages can comprise time exchange information in the RFD 868 standard protocol.)

Because STPs are paired, related messages could come across different STPs. Thus, for example, an IS-41 invoke message could come across STP 24 and its corresponding IS-41 return result message could come across STP 26. Message traffic captured from each STP 24, 26 is merged via a merge catcher process 46 that may reside on STP merge processor 35, which may be implemented with an HP K 400. This ensures that all messages of interest are combined for forwarding by message data communication process 48 to the central message processor 50. The message communication process 48 implements the real-time message decoder 114 process shown in FIGS. 6A and 6B and described below. Generally, this process formats and sends received messages to the central message processor 50.

To central message processor 50, the data feed flowing from STP capture device 34 is just like any other data feed from any other data capture device 30. Thus, processing of data captured from STP pair 24, 26 proceeds as described generally above and in more detail in text associated with FIGS. 8–11.

FIG. 5 shows switch capture device 36. Switch 11 is an AT&T switch that operates via a proprietary format, EFTN, often favored by wireless service providers because of advanced features it provides that otherwise would not be available. Switch 11 comprises various components including at least one Executive Control Process ("ECP") and connects to an Operations and Management Platform ("OMP") 53 provided by AT&T. OMP 53 may be provided with a package (purchased from AT&T) capable of translating any EFTN message that has an equivalent IS-41 message into that equivalent. The equivalent is then stored in a buffer located at OMP 53. The buffer may be polled for messages of interest.

Thus, Message Visibility ("MV") client process 54 may periodically request from the OMP 53 IS-41 messages of a particular class or classes. Requests from the "client" switch capture device 36 to the "server" OMP 53 initiate a Remote Procedure Call ("RPC") protocol that executes a server function running on the OMP 53 to send requested data. MV client process 54 filters received messages, transmitted in TCP/IP format, to choose only message types of interest, as defined by the preselected set. For instance, the set of six messages identified above could be selected. Selected messages are written to a daily file, like direct access storage 55. A message data communication process 56 formats the stored messages into an appropriate format (such as that shown in FIGS. 7A–7C).

Components of switch capture device 36, (e.g., MV client process 54, storage 55 or message communication process 56) may reside on central message processor 50 to maintain transparency across the system. Formatted messages are stored in a file within central message processor 50 so that the processing portions can parse the file and obtain the stored messages. (Message communication process 56 has the same functionality as message communication process 48 described in FIG. 4.) To the message processing portions of the central message processor 50, messages received from switch capture device 36 are the same as messages received from other data capture devices 30 and processed in the same fashion.

Industry trends are away from proprietary protocols and toward standardization. Nevertheless, even though switch capture device 136 is described as for use with the AT&T switch 11, it could easily be modified to work with other manufacturers' switches should trends reverse and proprietary protocols be deployed (and assuming manufacturers offer translation packages).

Each embodiment of data capture device 30 could be monitored for failure in its data feed. For example, a daemon subprocess may be provided on the link capture device 32, the STP capture device 34, or the switch capture device 36 that periodically checks to ensure that the captured data has been transmitted. If a selected interval passes without data transmission, the daemon subprocess could activate an automatic dialing device that causes a preselected paging number (or several) to be dialed and a stored message to be sent.

Thus, one or several designated network service personnel could receive a message that identifies the particular data capture device 30 and indicates that its data feed was down. Network service personnel could then promptly proceed to place the data capture device 30 back on line.

Selection and Packaging of Captured Data for Transmission

Returning to a more detailed description of link capture device 32, FIG. 3 shows various processes implemented by it and FIGS. 6 and 7 describe those processes in detail. Processing and formatting associated with FIGS. 6 and 7 also may be implemented by the STP capture device 34 or switch capture device 36. (Although TCP/IP connection requests do not have to be made for the switch capture device 36, implementing the same functionality of other data capture devices 30 enhances system standardization and transparency.)

A real time decoder ("RTD") process 114 is entered at 120 by a function call. Each function call processes a single IS-41 message stored in the link message buffer 110, preferably the earliest received message consistent with FIFO principles. Processed messages are transmitted over WAN 40 from data capture device 30 to central message processor 50. As shown in FIG. 6A, following entry into RTD process 114 at step 120, condition check 122 determines whether a delay timer has expired.

The delay timer forces a wait time between reconnection attempts following either a shut down request or some other connection interruption. The delay timer therefore prevents expending too much processor time in fruitless checking of the connection. For example, the delay timer can be set for a first delay of thirty seconds. After expiration, connection check 124 determines whether a connection is up. If not, initialization step 126 attempts a connection. When no connection can be made, the delay timer is set and begins running again. (A longer delay (e.g., five minutes) might be chosen for this second delay period so that the connection problem can be resolved before initiation of another connection check.)

Generally, the RTD process 114 logs the incoming IS-41 message at step 154 (FIG. 6B) in a buffer, such as a circular buffer (not shown). The RTD process 114 then returns at step 156 to the instruction of the operating system 112 (in FIG. 3) which had been the next step prior to the RTD process 114 having been called.

If condition check 122 instead reveals that the delay timer has expired, RTD process 114 determines (according to known methods) at step 124 whether the data capture device 30 had an established TCP/IP connection with central message processor 50 across WAN 40. If no such connection established, RTD processor 114 at step 126 initializes a socket open process and attempts to set up a TCP/IP connection with the central message processor 50 over the WAN 40. The RTD process 114 at step 128 checks for a successful attempt to set up a TCP/IP connection. If not, the delay timer is set at step 129, the current message is logged at step 154 (FIG. 6B) in the circular buffer, and control is restored to operating system 112.

On the other hand, when condition check 124 shows a TCP/IP connection, the current message from link message buffer 110 is decoded according to known methods. Specifically, the message is examined to determine whether it is one of a set of messages of interest. In one illustrated embodiment, the decode message and IS-41 process 130 determines whether the message is one of six IS-41 messages of interest. Messages not of interest are discarded. (In STP capture device 34, STP catcher 42 may implement decode message process 130; in switch capture device 36, MV client process 54 may implement decode message process 130.)

Messages of interest are formatted (as shown at step 154 in FIGS. 7A–7C and described below) and held for transmission. Then, or if condition check 128 confirms an established TCP/IP connection, the RTD process 114 checks at step 132 whether any messages are in the circular buffer, which holds messages unsent due to lack of a network connection with central message processor 50. RTD process 114 at step 134 attempts to send the next message available in the circular buffer over the WAN 40 to the central message processor 50. Send check 136 determines if the transmission attempt of step 134 was not satisfactory; if not, then the message is left in its location in the circular buffer and retrieved for sending at a later time. On the other hand, after a successful transmission at step 134, RTD process 114 checks whether either all messages in the circular buffer have been sent (i.e., the buffer has been flushed) or a pre-set maximum number of messages from the circular buffer have been sent. Transmission continues until either condition is met.

After step 138 determines all or a pre-set number of messages were sent, then (referring to FIG. 6B) RTD process 114 checks at step 140 for an incoming message, like one from an operator or from central message processor 50. If a message has been received (e.g., at a TCP/IP socket over WAN 40), host process step 142 processes it. For example, the host could send any of multiple messages including: (i) a shutdown message; (ii) a shutdown response or (iii) an error message. Shutdown messages request the link capture device 32 to close connections and properly store all data received but not yet transmitted upon receipt of a shutdown request. Link capture device 32 also can request shutdown. In that case, the shutdown response from central message processor 50 acknowledges and authorizes shutdown. Error messages simply indicate a system error. They are logged so that the time and date of the error is tracked for later analysis.

Shutdown check step 144 determines if the processed message indicates that a shutdown of a data capture device 30 has been ordered. (A shutdown message may be sent, for example, if a link capture device 32 is to be removed from service for maintenance or other reasons.) Shutdown results in closing the TCP/IP connection at step 146, and setting the delay timer at step 148. The message is logged in a file, and control returns to the operating system 112. According to the described logic, graceful shutdown can thereby be achieved, since any data currently being handled is retrievably stored, avoiding its loss. To facilitate an operator (of the data capture device 30 or central message processor 50) in removing the device from service without the central message processor 50 failing to be notified, data capture device 20 may optionally include a "hotkey." The "hockey" prompts an operator of the data capture device 20 for confirmation of a command to shutdown communication and would forward a message to central message processor 50 if confirmation were received.

If step 140 had detected no incoming message from the socket, RTD process 114 determines whether the circular file is empty. This condition might occur if, for example, a pre-set maximum number of messages can be sent, and have been (as determined at step 138), but the circular buffer still contains messages. Transmission of the current message from link message buffer 110 would occur prior to sending earlier-received messages. Therefore, if the circular buffer is not empty, the current message is stored there in order to maintain FIFO discipline.

In the absence of a shutdown message, then at step 154 RTD process 114 attempts to send the current message over the WAN 40 to the central message processor 50. Control returns to the operating system 112 whether the message was successfully sent or not successfully sent (in which case it is subsequently logged in the circular file at step 150).

Each captured IS-41 message sent at step 154 (FIG. 6B) is preferably sent in a separate packet or other discrete block of data. Numerous formats providing suitable functionality could also be used. Generally, the format selected is such that the system is provided sufficient information regarding the origination (source, timing, etc.) of packaged data that error tracking and debugging is easier. If the TCP/IP protocol is used, however, FIGS. 7A–7C show one manner of formatting a data packet. The format shown is an application level format that can work with any other protocol, for example, X.25.

Thus, a data packet containing a captured IS-41 message is organized into a TCP/IP packet containing a header of nineteen bytes and a variable length data block, as shown in FIG. 7A. The header, shown in greater detail in FIG. 7B, includes: (1) an STS ID that may be a three byte ASCII identifier (which may be stored at and retrieved from a storage medium such as a disk drive) for uniquely identifying the particular data capture device 30 from which the data is sent; (2) a link number identifier of three bytes for specifying from which of the monitored SS7 links the captured message was derived if a link capture device 32 obtained the message; (3) a one-byte opcode for indicating whether the packet is carrying data or whether the data capture device 30 is shutdown (an ASCII D indicating data and an ASCII S indicating shutdown); (4) a message type code of one byte and containing ASCII for one of the integers in the set {1, . . . , N} of messages of interest to identify which type of IS-41 (or other standard) message was captured; (5) a TCAP (transaction capabilities application part, a component of the SS7 architecture) transaction ID of six bytes and (6) an indication of the total message length, allocated five bytes. The data portion of the message packet, shown in FIG. 7C, includes a time stamp of four bytes for containing an integer indicating the time at which the message was captured. A TCAP transaction ID field and DPC/OPC (Destination or Origination Point Codes) field also are included in the data portion. Finally, the unaltered IS-41 message payload, which can be of variable length, completes the data. Preferably, one captured message is allocated to a particular packet.

Generally, the same packet format can be used for messages originating from a STP capture devices 34 or a switch capture devices 36. For STP capture devices 34, the STS ID may be its particular assigned identification number and the link number may be the individual ECU from which the packet originated. (MSCs may have multiple ECPs that are usually included in IS-41 message headers.) The header for the switch capture device 36 will include the same information (i.e., switch capture device 36 identification and ECU identification). While the information in the packet shown in FIGS. 7A through 7C is generally used for system maintenance and debugging, it also has some use to customer support personal at customer on-line work stations 60, 62 and 64. For instance, the DPC/OPC point codes may be displayed on the work stations 60, 62 or 64 to indicate generally the origination and designation of particular message. (Even though a number of SIDs may be associated with a particular point code, there is some correlation between the point code and location of a subscriber; experienced customer services representatives will recognize and be assisted by this correlation.)

Processing of Captured Data

Referring again to FIG. 1, data capture devices 30 are coupled to the central message processor 50 by a suitable data transmission medium like, for example, the WAN 40. Central message processor 50 can communicate by way of the WAN 40 to one or more customer on-line stations 60, 62, and 64 or to the fraud detection system 70.

Central message processor 50 preferably may receive, aggregate and route input from a number of data capture devices 30 or analogous devices. Central message processor 50 may be implemented by any processing device having sufficient input/output channels and processing capacity for performing the operations described below, and running any suitable operating system. For example, central message processor 50 may be an HP-840, manufactured by Hewlett-Packard Co. and running the UNIX operating system, HP-UX 10.0. Alternatively, the central message processor 50 may be an HP 9000 H40, also manufactured by Hewlett Packard Co. (Any workstation programmed configured according to the present invention could conceivably perform as the central message processor 50 depending on the volume of records and number of users.)

FIG. 2 describes the functionality and data flows associated with central message processor 50 regardless of the platform used to implement it. FIGS. 8–11 illustrate the logic flows associated with processes implemented by central message processor 50 for carrying out its functions.

Figure 8:
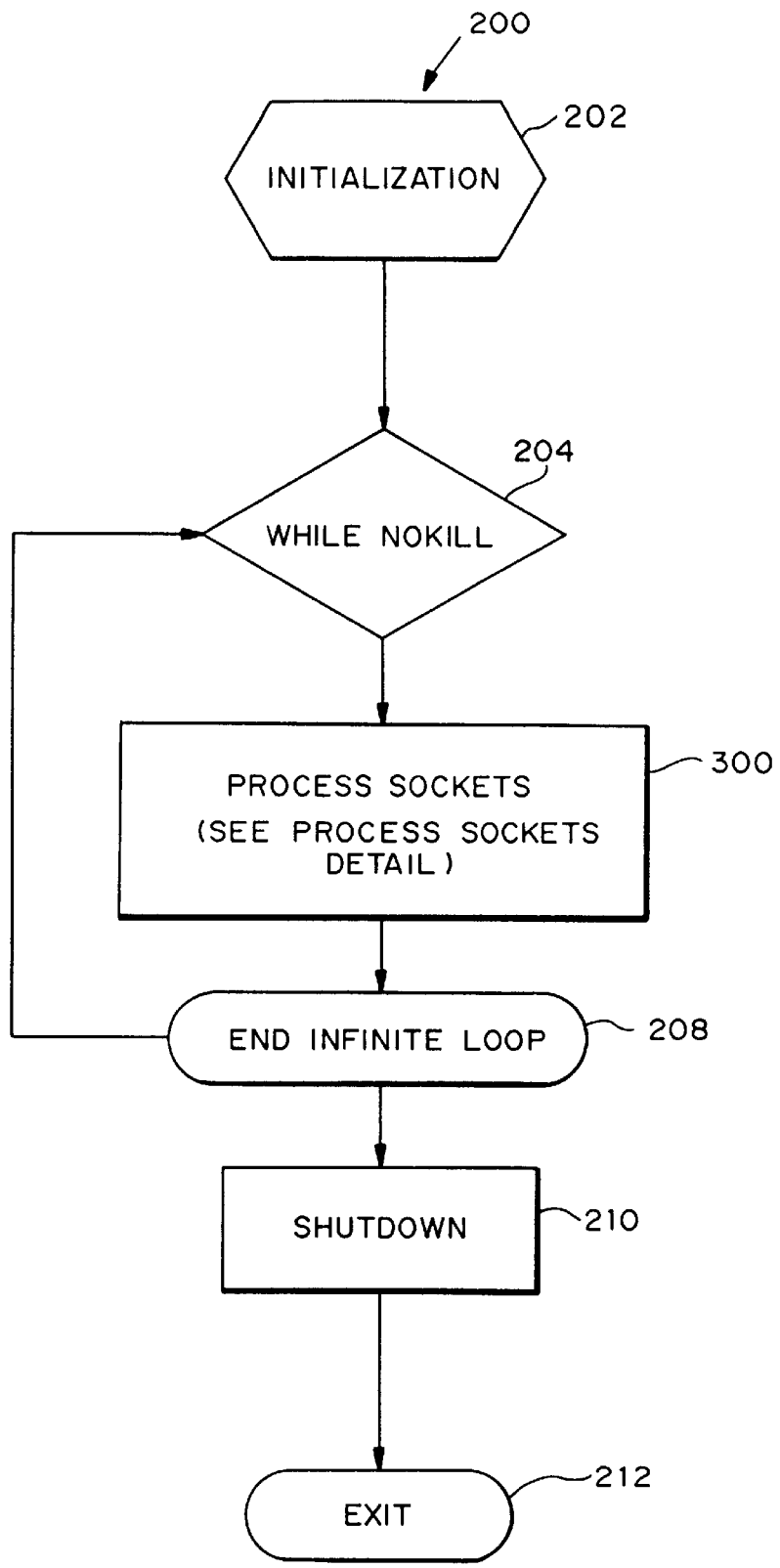
FIG. 8 is a flowchart illustrating at a high level of abstraction the logic flow of the processing performed by a central message processor illustrated in FIG. 1–3.

FIG. 8 illustrates the logic flow for a high level loop 200 implemented by central message processor 50. Since the primary function of the central message processor 50 is to collect data sent to it by a plurality of data capture devices 30, the central message processor 50 devotes a portion of its attention to monitoring input received at its ports. To this end, it implements server functionality for interfacing with an application program running on a remote client system. The interfacing functionality may be implemented, for example and without limitation, by the TCP/IP Sockets API (application programming interface). The Sockets API may be used to implement a client-server relationship between two application programs running in different computing environments, such as between data capture devices 30 and central message processor 50. The Sockets API can permit access to protocols other than TCP/IP.

Figure 9:
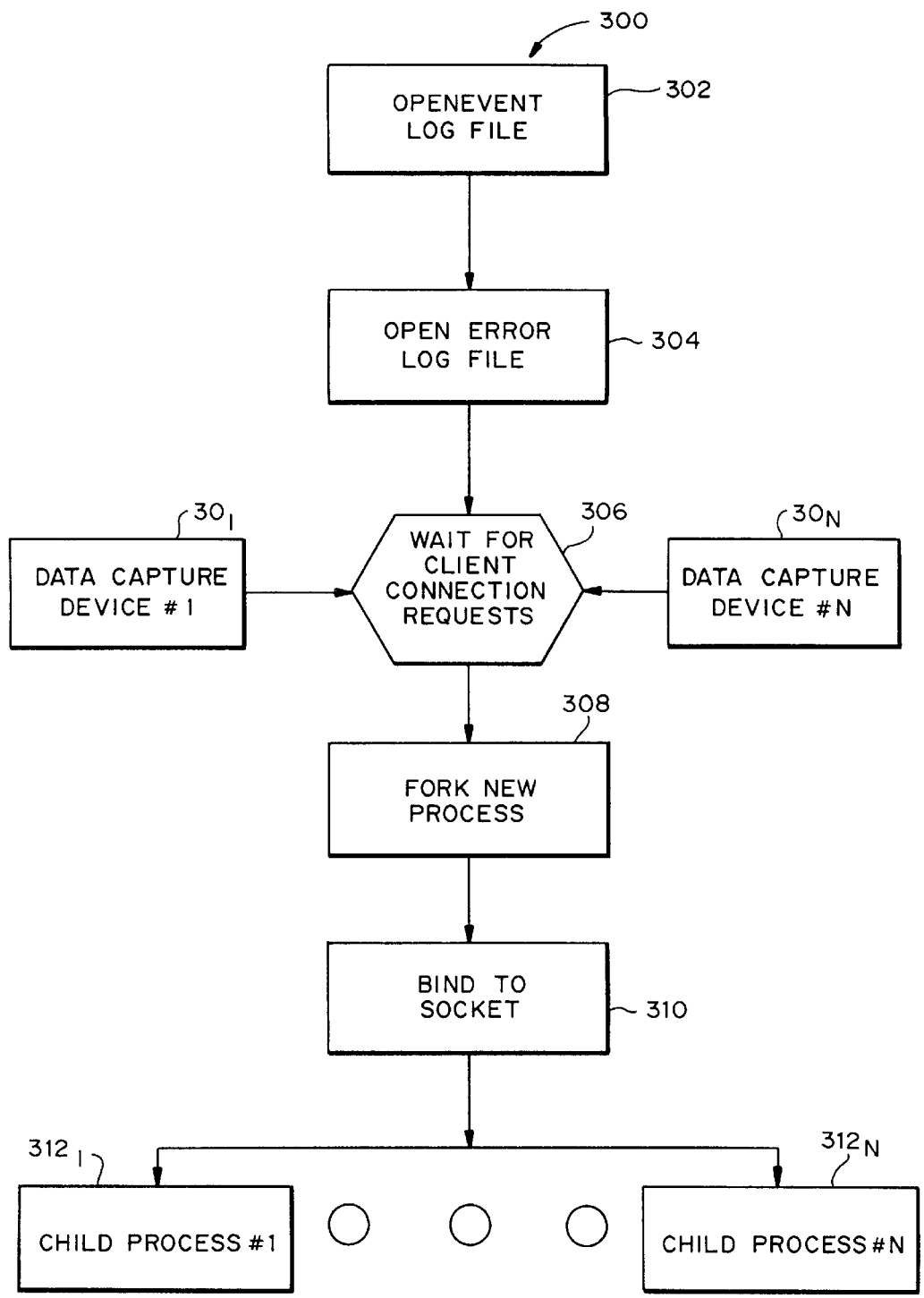
FIG. 9 is a flowchart illustrating the logic flow of a socket processing module of the logic flow illustrated in FIG. 8.

After initializing at step 202, the high level loop 200 processes the sockets, via which the results from data capture devices 30 are received. As long as the loop has not been terminated, as checked at step 204 (While NoKill), a process sockets routine 300, illustrated in FIG. 9, is called. When (i) the high-level loop 200 returns from the process sockets routine 300, (ii) the end of the loop 200 is reached at 208, and (iii) if shutdown has been requested by the operator, then the process implements a shutdown routine 210 that stores any unprocessed data to prevents its being lost. The high level loop 200 then exits at 212. As long as no shutdown request has been received, however, the high level loop 200 cycles between steps 204 and 208, continually processing TCP/IP packets received at the sockets from the data capture devices 30.

Logic flow associated with the process sockets routine 300 is shown in FIG. 9. Generally, there are many socket child processes, which initialize in order to handle each connection request from particular data capture devices 30. Initially, an event log file is opened at 302 and an error log file is opened at 304. These files are used for general debugging and maintenance activities. For example, the event log file may be used for informational messages like open, close, shutdown, etc. The error log records warnings and system errors. At 306 the process waits for connection requests from a number (1, . . . , N) of data capture devices 30 that are essentially clients served by the central message processor 50. When a TCP/IP connection request has been received, routine 300 at step 308 forks a new child process 312 to handle it. The routine 300 binds the newly forked child process 312 to a socket at 310, creating as many child processes $312_{1-N}$ bound to each socket as there are data capture devices 30 that have requested connections to central message processor 50.

Of course, switch capture devices 36 that reside on the central message processor 50 can store their captured data in a file on the central message processor 50. No process sockets routine need be initiated for these switch capture devices. Instead, the collation processing shown in FIG. 10 is done by accessing the resident file holding the captured data.

Figure 10A:
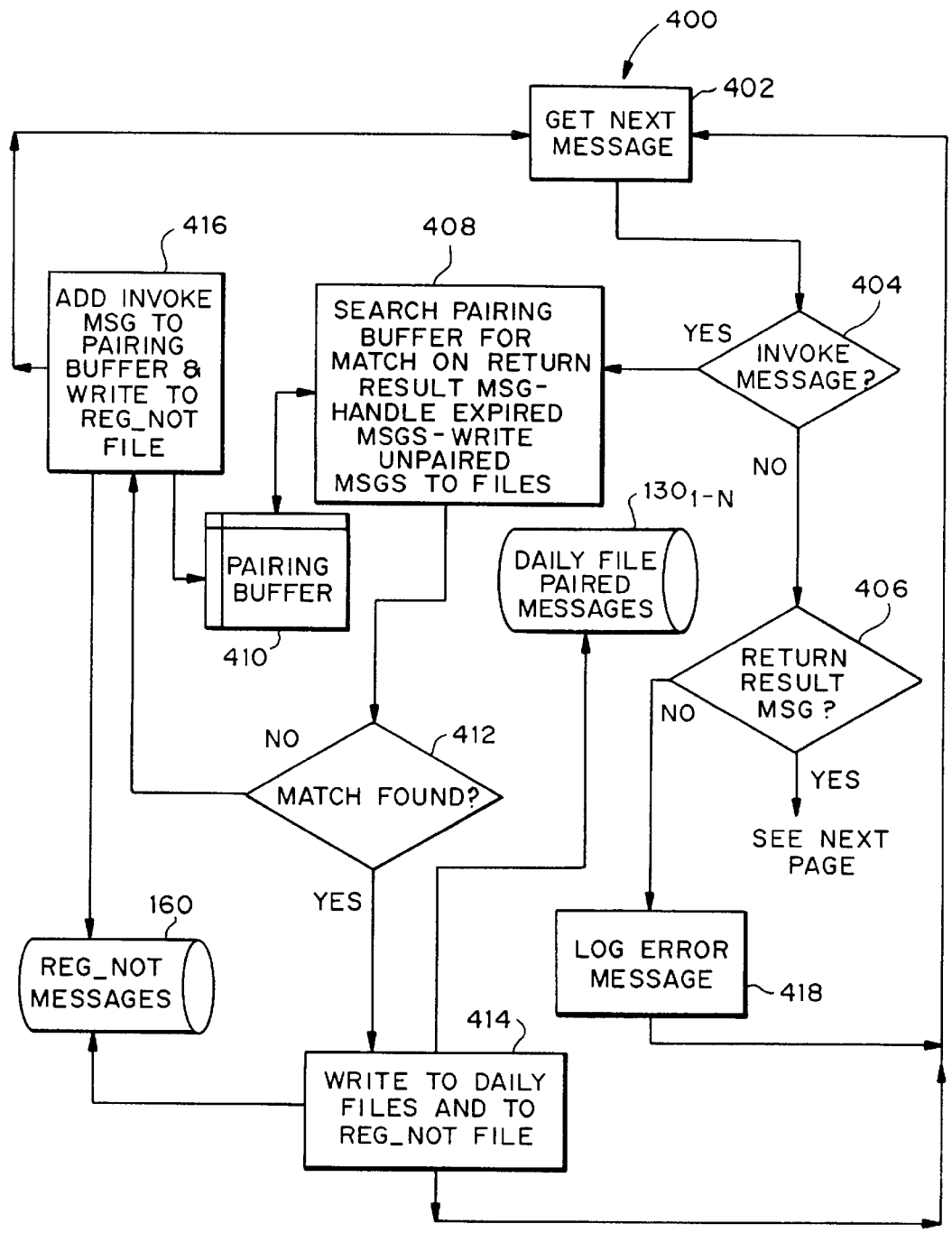
FIGS. 10A–B are flowcharts illustrating the logic flow of a "process sockets" module of the socket processing module illustrated in FIG. 9.
Figure 10B:
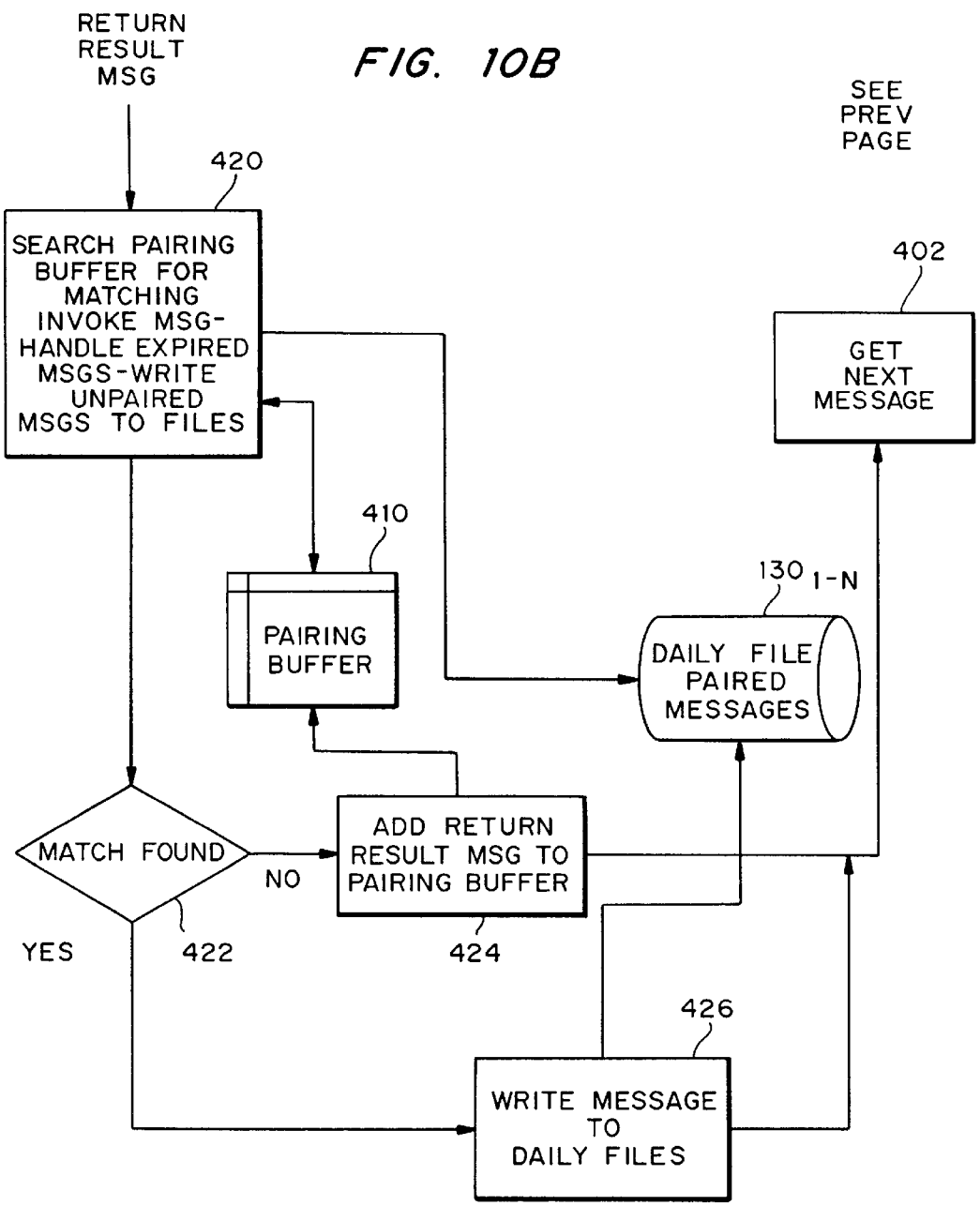

Logic flow associated with a collation process 400 of each forked child process $312_{1-N}$ is illustrated in FIGS. 10A–B. The collation process 400 collates received messages to yield more useful visibility and fraud data. At step 402 the message contained in the packet received from the data capture device 30 corresponding to the current socket is retrieved. Type check step 404 checks to determine whether it is an invoke message. Invoke messages are processed via searching step 408 that searches the pairing buffer for its matching return result message. Matches may be found by comparing the transaction Ids and DPC/OPC of the message. (IS-41 messages each carry a transaction ID; return result messages have an ID that matches the ID of the invoke message leading to generation of the return result message.)

No match as determined by check step 412 results in the invoke message being written by step 416 to the pairing buffer 410 and Reg_Not message file 160. On the other hand, when matches are found at step 412 they are written to the daily files paired messages database 130 and the Reg_Not file 160 at record step 414. (Reg_Not messages written to Reg_Not file 160 will later be retrieved and processed according to logic described in connection with FIG. 11.) The collation process 400 then begins again at step 402, which retrieves the next message.

Assuming the next message is not an invoke message, it will pass through type check step 404. Step 406 checks the passed message, which either is an error or return result message. Error messages are logged at step 418. Return result messages are processed by the logic of FIG. 10B. Step 420 searches the pairing buffer 410 for the invoke message that matches the return result message being processed. If no match is found at check step 422, the return result message is added to the pairing buffer 410. Matches, however, found at check step 422 are written at record step 426 to the daily file database 130. After either adding the return result message to the pairing buffer 410 or, if paired, to daily file database 130, the loop restarts at step 402.

Note that the processing associated with FIGS. 10A and 10B is directed to finding mates of invoke and return result messages and saving unmated messages until missing mates are captured and matched. This processing is necessary since the invoke and return result messages may not necessarily be captured and transmitted to the central message processor 50 immediately in the order in which they were generated. Thus, it is possible that a particular return result message is received well before its mating invoke message. Absent proper processing the return result message may be lost, eliminating valuable visibility or fraud data. For return result messages resident in the pairing buffer 410 for longer than a predetermined period, those "expired message," are identified by step 420 and then discarded. This is because the central message processor 50 generally receives return result message that may relate to invoke message that are not of a desired IS-41 message type. On the other hand, expired invoke messages identified at step 408 are flagged as unpaired and sent to the daily file database 160 for ultimate forwarding to a customer support station 60, 62 or 64 or fraud detection system 70. Expired invoke messages are saved because they may still provide the system information such as why the customer had a problem.

Elimination of Redundant Data

Logic flow for the registration message processing and filtering 170 is illustrated in FIG. 11. As described in the Background section, fraud data comprising roamer registrations may already be available (e.g., from GTE Nationwide Roamer Data Delivery Services, GTE-TSI's "IREC" service or the Roamex service provided by Systems Link). A service provider employing systems and methods described in this document may already be using these or similar existing fraud data services, particularly if deploying the systems and methods described still would not provide total coverage for a market of interest. Also, such third party systems may provide services other than just fraud data. For example, billing applications could be supported by other data provided by third party systems.

Multiple sources of fraud data (i.e., data captured by the present invention and data provided from third party systems) may generate redundant data incoming into fraud detection system 70. This is objectionable for several reasons. First, the service provider is paying per transaction fees (which translates into a lot of money) for data that a system such as the present invention is already providing. Obviously, purchase of the redundant data from the third party system could be discontinued. But other data or services provided by the third party system may render that course impractical. Second, the fraud detection system 70 may generate erroneous results in the form of false positive fraud detections. With multiple data sources, two or more records of the same event could be generated, which may trigger a fraud detection system since it may analyze the data and conclude that multiple phones with the same MIN/ESNs were operative at the same time. Further, sending and processing redundant data ties up network bandwidth and valuable processing power.

To eliminate redundant data, the present invention provides a registration message processing and filter process 170 (implemented by central message processor 50) as described by the filtration process 500 shown by FIG. 11. A filters table 502 includes the identification of every MSC for which data is commercially received. Typically the identification is a System Identification Number or "SID" and, for smaller providers that simply contract another provider's network and provide billing services, a Billing Identification Number or "BID." Thus, for example, if data were already being sent to fraud detection system 70 for a switch in Nashville, Tenn., the filters table 502 would include that system's SID (or BID).

Once the filters table 502 has been loaded into memory at load step 504, creating a list of SIDs (and BIDs) whose data should be filtered out, the next Reg_Not messages are read from a daily Reg_Not file 160 at read record step 506. As noted, IS-41 messages carry various origination data, including the SID (or BID) for the MSC servicing the customer who generated the particular Reg_Not message ("Serving_MSC"). At comparison step 508, a check is made as to whether the SID for the Serving_MSC from which the Reg_Not message came matches any SID in the filters table 502 loaded in memory. If a match is detected, the present Reg_Not message read at step 506 is ignored, and the process loops to select at step 506 the next record from Reg_Not file 160 and compare the SID associated with that record against the SID values in the filters table 502. Again any Reg_Not message with a Serving_MSC listed on the filters table 502 is ignored. But if the Serving_MSC is not on the filters table 502, then the current message is transmitted by a transmission process 510 to a fraud detection system 70. Transmission process 510 may also implement a process for appropriately packaging the data to match the format of a particular fraud detection system 70. Thus, by way of example, if used with the CloneDetector system, the message is parsed for its SID and a header necessary to implementing the CloneDetector functionality is added. (Customized packaging of the filtered data to match formats required by other fraud analysis systems is well within the ability of one skilled in the art.)

In this way, a fraud data feed in the form of non-redundant roamer registrations is sent to a fraud detection system 70. The fraud detection system 70, using data from this feed and perhaps other feeds like those from third party systems described above, analyzes this data to help detect fraud.

Customer On-Line Support Applications

Figure 12:
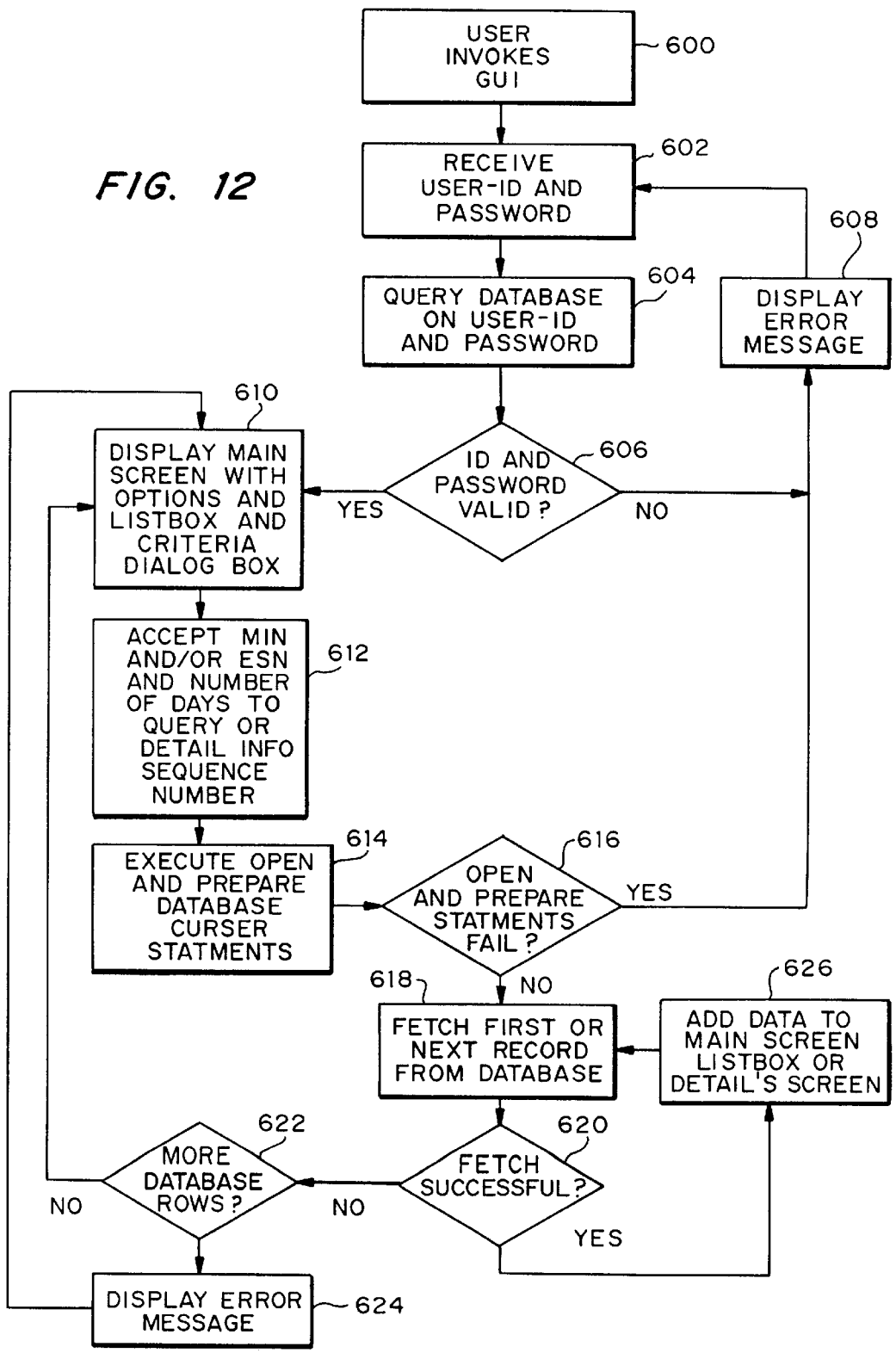
FIG. 12 is a flowchart showing the processing flow associated with operating an embodiment of a customer on-line support station.

Customer on-line support requires a user friendly system, typically run in a WINDOWS environment, for viewing in real time current roaming traffic in and away from home markets and allowing inquiries on roamer status anywhere within the digital SS7 network. A properly designed customer on-line support system provides an extremely efficient method for obtaining and displaying large volumes of data in real time. The data must be properly organized and displayed in order to give the customer service representatives a better picture of the wireless service provider's home market and the provider's roaming customers. One such on-line support system is shown deployed on support stations 60, 62 and 64 in FIG. 1. FIG. 12 shows the functionality that may be implemented by the support stations 60, 62 or 64.

A customer support operator accesses the support system at access step 600 by invoking the graphical user interface ("GUI") and inputting at receive step 602 an ID and password. After the database is queried at step 604, an ID and password check is performed at validity check step 606. Invalid IDs or passwords generate an error message displayed at step 608. Otherwise valid IDs or passwords generate a main option screen at step 610. A cellular user's MIN or ESN and search parameters are entered at step 612. For example, the number of days of call activity data for the input MIN may be one search parameter. Search criteria for identifying the user other than MIN or ESN may be used for other fraud detection systems. Alternatively, instead of manually entering search parameters each time, the system can be set to a default search or the operator can enter a "profile" sequence number associated with specific search parameters.

In any event, the database upon which all system fraud data resides is opened at step 614. The database is partitioned by day so that information retrieval is more efficient. Step 614 opens and prepares the database, while step 616 confirms that operation; if there is a failure an error message is displayed. Records are fetched from the database at step 618 and added to the main screen list box at step 626. The main screen list box allows the customer support application to store in RAM the results for the search perimeters entered. This allows the particular customer on-line support stations 60, 62 or 64 to obtain its search results and load them locally for further processing, thereby providing distributed processing of search results to eliminate or minimize demands on the host database and its processor. If step 620 determines that a record fetch was unsuccessful, it may mean that the search results all have been retrieved. But if step 622 also determines that more data rows should be displayed, an error has occurred that step 624 displays. Otherwise, step 622 cycles back to the main screen display step 610 to await a new search by the operator.

The General Case

This document has focused on describing several possible embodiments of the present invention, describing in particular detail alternative embodiments of data capture devices 30 coupled with a central message processor 50. Those skilled in the art will understand that of the alternative data capture devices 30 disclosed, the link capture device 32 is one of the most flexible because persons implementing the present invention need not rely on the assistance of third parties. For example, implementation of STP capture device 34 requires access to the telephone company's network; not all wireless providers will have such access, particularly where the network operator is a fierce competitor. Similarly, the switch capture device 36 requires obtaining expensive translation packages from switch manufacturers like AT&T and places the provider implementing the switch capture device 36 at the mercy of the switch manufacturer, who could always change protocols, overcharge for or eliminate altogether the translation packages.

Additionally, although the described embodiment discusses using a "central" message processor 50, the functionality of the central message processor 50 may be implemented by the data capture devices 30 simply by choosing platforms with sufficient processing power to perform the collating and filtering tasks of the central message processor 50. For example, link capture device 32 or STP capture device 34 each could be deployed on larger, more powerful workstations and couple via bus to a processor portion that processes selected message, pairing invoke and return result messages and saving unpaired invoke messages. Filters tables could even be downloaded to each data capture device 30 so that they can do necessary filtering of redundant fraud data.

Indeed, such a network design would decrease overall system bandwidth requirements and take advantage of the flexibility of distributed processing. That is, by having a central message processor 50 perform message collating and filtering, providers implementing the present invention must capture and send all return result messages as well as the invoke messages of interest to the central message process 50. This obviously consumes significant system bandwidth. Of course, it may allow for lower hardware costs since less powerful processing platforms need be deployed as data capture devices 30. In any event, those skilled in the art will recognize that the present invention contemplates various embodiments of data capture devices 30 and either distributed or central processing of captured messages so as to provide useful fraud, roamer visibility, customer support, network traffic management or other data useful in administering a wireless telecommunications system.

The foregoing is provided for purposes of explanation and disclosure of preferred embodiments of the present invention. Modifications and adaptations to the described embodiments, particularly including changes, upgrades or revisions in response to new or revised signaling and transmission protocols or standards (including without limitation, X.25, IS-41, or SS7 standards), or changes in system architecture, will be apparent to those skilled in the art and may be made without departing from the scope or spirit of the invention and the following claims. By way of example, the "IS" in IS-41 stands for "Interim Standard." It is fully expected that the standard will be revised and message types of interest to users of the present invention will be added, particularly as new service features are deployed over networks. The present invention contemplates monitoring and capturing of such future message types.

What is claimed is:

1. Apparatus for generating wireless telecommunications system data for use in administering wireless systems and detecting fraud in their use, the apparatus in communication with at least one data capture device for capturing from a telecommunications network messages indicative of wireless telecommunications transmitted over the network, the messages corresponding to a first or second class, the apparatus comprising:
   a. means for receiving wireless telecommunications messages from the data capture device; and
   b. at least one message processor coupled to a first memory location and programmed to:
      i. store in the first memory location those of the received messages that belong to the first class;
      ii. collate each received message belonging to the second class with its mate by searching the first memory location for a previously stored message of the first class related to the received message of the second class; and
      iii. provide the collated messages to an end-user.

2. The apparatus according to claim 1, wherein the first class of messages includes invoke messages and the second class of messages includes return result messages.

3. The apparatus according to claim 2, wherein:
   a. the messages indicative of wireless telecommunications traffic are IS-41 messages;
   b. the first class of messages are IS-41 invoke messages;
   c. the second class of messages are IS-41 return results messages;
   d. the search for IS-41 invoke messages relates to each received IS-41 return result message and is to find an invoke message corresponding to a particular received result message; and
   e. the collating of related messages comprises the pairing of each received return result message with the invoke message corresponding to that return result message.

4. The apparatus according to claim 1, wherein the apparatus includes a second memory location, the telecommunications messages include registration notification messages, the message processor further being programmed to determine whether the message belonging to a first class is a registration notification message and, if so, to write the message to the second memory location.

5. The apparatus according to claim 4, wherein the message processor is centrally located and is further programmed to identify redundant data.

6. The apparatus according to claim 5, wherein the apparatus includes a third memory location containing source information identifying at least one outside source that provides particular registration notification data, the data capture device provides information regarding the origin of the registration notification data it provides, and the message processor identifies redundant data by checking the origin of each registration notification message to determine whether it originated from a location for which registration notification messages also are received from the outside source.

7. The apparatus according to claim 6, wherein the apparatus is in communication with a fraud detection system and the message processor is further programmed to provide registration notification data from the second memory location to the fraud detection system.

8. The apparatus according to claim 1, wherein, if no message located in the search of the first memory location is identified as related to the received message, then the received message is stored in the first memory location.

9. The apparatus according to claim 1, wherein the messages are each a member of a set of paired messages and the matching of each member with its pair produces matched sets, each fully identifying a wireless telecommunications system action.

10. The apparatus according to claim 1, wherein the data capture device comprises a link capture device comprising:
    a. at least one telecommunications link interface each corresponding and coupled to at least one telecommunications link for reading signals off the link; and
    b. a processor coupled to the telecommunications link interface and programmed to:
       i. retrieve signals read by the telecommunications link interface;
       ii. identify messages in the retrieved signals;
       iii. select messages belonging to a preselected set of message types of interest; and
       iv. transmit the selected messages to the message processor.

11. The apparatus according to claim 1, wherein the data capture device comprises a Signal Transfer Point capture device comprising:
    a. at least two preprocessors, each coupled to one of a pair of coupled Signal Transfer Points, the preprocessors each programmed to:
       i. communicate via a communications link with one Signal Transfer Point;
       ii. select messages of interest passing through the Signal Transfer Point; and
       iii. transfer selected messages to:
    b. a merge processor coupled to each of the preprocessors and programmed to:
       i. receive selected messages of interest from each preprocessor;
       ii. merge the selected messages from each preprocessor; and
       iii. forward the messages to the message processor.

12. The apparatus according to claim 1, wherein the data capture device comprises a switch capture device for interfacing with a wireless telecommunications network switch that includes a buffer for holding wireless telecommunications messages translated into a standard format and means for responding to a remote request, the switch capture device comprising a message visibility processor programmed to:
    a. request messages of interest from the remote request response means;
    b. receive messages of interest and store received messages; and c. periodically provide at least some of the stored messages to the message processor.

13. The apparatus according to claim 1, wherein the receiving means comprises a bus that couples the data capture device to the message processor.

14. A method for generating wireless telecommunications system fraud and visibility data for use by a wireless telecommunications service provider in administering its wireless system and detecting fraud in its use, the method apparatus with at least one memory location and in communication with at least one data capture device for capturing and transmitting messages indicative of such traffic, the messages corresponding to a first class or a second class, the method comprising the steps of:
   a. receiving messages indicative of wireless telecommunications traffic from the telecommunications message data capture device;
   b. storing the received messages belonging to the first class in the memory location;
   c. for each received message belonging to the second class:
      i. searching the memory location for a previously stored message of the first class related to the received message; and
      ii. if any message located in the search is related to the received message of the second class, collating the received message with the located message; and
   d. providing the collated messages to an end-user.

15. The method according to claim 14, wherein:
the messages indicative of telecommunications traffic are IS-41 messages;
the first class of messages are IS-41 invoke messages;
the second class of messages are IS-41 return results messages;
the search for IS-41 invoke messages related to each received IS-41 return result message is to find an invoke message corresponding to a particular received return result message; and
the collating of related messages in step c.ii. comprises the step of pairing each received return result message with the located invoke message corresponding to that return result message.

16. The method according to claim 14, wherein the apparatus includes a second memory location, the telecommunications link messages include roaming wireless telecommunications registration notification messages, and further comprising the step of checking whether the message belonging to a first class is a registration notification and, if so, writing the message to the second memory location.

17. The method according to claim 16, wherein the apparatus includes a third memory location containing source information identifying at least one outside source from which registration notification data is received, the data capture device provides information regarding the location of origin of particular registration notification messages, and the method further comprising the steps of:
   checking whether each registration notification message originated in a location for which registration notification messages are received from an outside source; and
   if the message did originate in a location for which registration notification messages are received from an outside source, discarding that registration notification message.

18. The method according to claim 17, wherein the apparatus is in communication with a fraud detection system, and the method further comprises the step of providing registration notification messages from the second memory location to the fraud detection system.

19. The method according to claim 14, further comprising the step of writing the collated messages to a file containing entries for messages captured on a particular day.

20. The method according to claim 19, further comprising the step, before providing the collated messages to an end user, of reading records from the files containing messages captured on particular days and inserting them into a database containing message entries organized according to the day of the occurrence of calls to which the messages pertain.

21. The method according to claim 14, further comprising the steps of, prior to receiving the messages, monitoring a telecommunications network element or link in order to capture messages of interest and providing captured messages to the message processor.

22. The method according to claim 21, wherein the monitoring step comprises the steps of:
   a. reading signals off a telecommunications link via a telecommunications link interface; and
   b. programming a processor, coupled to the telecommunications link interface, to:
      i. retrieve signals read by the link interface;
      ii. identify messages in the retrieved signals; and
      iii. select messages belonging to a preselected set of message types of interest.

23. The method according to claim 21, wherein the monitoring step comprises the steps of:
   a. obtaining messages of interest from each Signal Transfer Point in a pair of Signal Transfer Points; and
   b. transferring messages of interest to a merge processor for merging the messages of interest obtained from each Signal Transfer Point.

24. The method according to claim 21, wherein the network element comprises a switch, across which flow messages in a proprietary format, and the monitoring step further comprises the steps of:
   a. translating, at the switch, proprietary format messages into a standard format;
   b. storing, at the switch, the translated messages;
   c. requesting from the switch translated messages belonging to a preselected set of message types of interest.

25. A method of furnishing visibility and/or fraud data relating to wireless telecommunications based on signals carrying messages pertaining to such communications, the signals being transmitted through a network element or over at least one telecommunications network link coupled to at least one switching center, a data capture device being coupled to the link or the network element and including at least one memory coupled to a processor, the data capture device being in communication with an administrative instrumentality for monitoring, servicing or otherwise administering a telecommunications system, the method comprising the steps of:
   a. obtaining telecommunications signals from the link or the network element, the signals containing messages pertaining to wireless telecommunications;
   b. identifying messages pertaining to wireless telecommunications present in the signals;
   c. selecting identified messages belonging to a preselected set of message types of interest; and
   d. providing each selected message to the administrative instrumentality.

26. The method according to claim 25, wherein the preselected set of message types comprises a message type selected from the group consisting of: wireless telecommunication registration notification; wireless telecommunication qualification information; and wireless telecommunication service profile request information.

27. The method according to claim 25, wherein the messages comprise IS-41 messages and the preselected set of message types comprises:

a. registration notification;

b. qualification request;

c. qualification directive;

d. service profile request;

e. service profile directive; and f. return result.

28. The method according to claim 27, wherein the signals propagating on the links comprise signals transmitted according to the SS7 signaling standard.

29. The method according to claim 25, wherein the providing step comprises the steps of formatting the selected messages and transmitting the selected messages to the administrative instrumentality.

30. The method according to claim 29, wherein the transmission step further comprises the steps of determining whether a transmission medium connection is available for communicating the message to the administrative instrumentality, and, if the connection is not available, attempting to establish the connection.

31. The method according to claim 30, further comprising the step of logging the selected message in the memory if the attempt to establish a connection was unsuccessful.

32. The method according to claim 31, further comprising the steps of checking whether any formatted message to be transmitted is in the memory, attempting to transmit one of those messages in the memory to the administrative instrumentality, and, if the attempt to transmit the message was unsuccessful, re-logging the message in the memory.

33. The method according to claim 32, further comprising the steps of: checking whether the data capture device has received a shutdown command and, if a shutdown command has been received, terminating the communication connection with the administrative instrumentality.

34. The method according to claim 33, further comprising the steps of setting a delay timer after terminating the communication connection and checking whether a transmission medium connection is available only after expiration of the delay timer.

35. The method according to claim 25, wherein the administrative instrumentality comprises a fraud detection system receiving messages of interest from an outside source and, before providing each selected message in step d, further comprising the step of filtering the selected messages to eliminate messages of interest received from the outside source.

36. A method of generating data for use by a wireless telecommunications service provider in administering its wireless telecommunications system or detecting fraud in its use, the system including a plurality of devices each for monitoring and capturing selected wireless telecommunications messages, each of the plurality of monitoring and capture devices communicating with a message processor having a memory, the method comprising the steps of:

a. capturing messages transmitted on each of a plurality of links or a network element; and b. providing to a message processor captured messages generated by roaming subscribers and belonging to a preselected set of message types.

37. The method according to claim 36 wherein each of the captured messages corresponds to a first class or a second class and the processing step further comprises the steps of:

a. determining whether each message belongs to the first class of messages;

b. if a message belongs to the first class of messages, storing that message in the memory location;

c. determining, for each message not belonging to a first class of messages, whether the message belongs to the second class of messages; and d. collating the second class messages by:

i. searching the memory location for a previously stored message of the first class related to the received message of the second class; and ii. if any message of the first class located in the search of the memory location is related to the received message of the second class, collating the second class received message with the located first class message.

38. The method according to claim 37 further comprising the step of processing through the message processor the captured messages to create (i) a database containing paired sets of messages, each paired set describing a particular wireless telecommunication transaction, or (ii) a database containing expired invoke messages of the preselected set of message types.

39. The method according to claim 38, wherein the capturing step further comprises the steps of:

a. coupling at least one telecommunications link interface to at least one telecommunications link for reading signals off the link;

b. retrieving signals read by the telecommunications link interface;

c. identifying the preselected set of message types in the retrieved signals.

40. The method according to claim 38, wherein the capturing step further comprises the steps of:

a. coupling a first preprocessors to one of a pair of coupled Signal Transfer Points and coupling a second preprocessor to the other of the pair of coupled Signal Transfer Points;

b. communicating through the preprocessors via a communications link with one Signal Transfer Point;

c. selecting via the preprocessor the preselected set of message types passing through the Signal Transfer Point.

41. The method according to claim 38, wherein the capturing step further comprises the steps of:

a. providing the wireless system with a telecommunications network switch that includes a buffer for holding wireless telecommunications messages translated into a standard format; ; and b. programming the switch to at least temporarily buffer messages comprising the preselected set of message types.

* * * * *

UNITED STATES PATENT AND TRADEMARK OFFICE
CERTIFICATE OF CORRECTION

PATENT NO. : 6,014,557
DATED : January 11, 2000
INVENTOR(S) : John W. Morton and Thomas C. Smith It is certified that error appears in the above-identified patent and that said Letters Patent is hereby corrected as shown below:

Column 3, lines 24-25, delete "if they choose not to utilize the clearinghouses for validating particular transactions"

Column 10, line 13, delete "DIR" and insert --REQ-

Column 10, Line 14, delete "REQ" and insert --DIR--

Signed and Sealed this

Tenth Day of April, 2001

Attest:

NICHOLAS P. GODICI

Attesting Officer   Acting Director of the United States Patent and Trademark Office